(12) United States Patent
Grzesiak et al.

(10) Patent No.: US 12,175,974 B2
(45) Date of Patent: Dec. 24, 2024

(54) ELECTRONIC DEVICE AND OPERATING METHOD THEREOF

(71) Applicant: SAMSUNG ELECTRONICS CO., LTD., Suwon-si (KR)

(72) Inventors: Grzegorz Pawel Grzesiak, Warsaw (PL); Radoslaw Czerski, Warsaw (PL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 17/878,230

(22) Filed: Aug. 1, 2022

(65) Prior Publication Data

US 2023/0077117 A1  Mar. 9, 2023

(51) Int. Cl.
*G10L 15/22* (2006.01)
*H04W 4/80* (2018.01)

(52) U.S. Cl.
CPC ............... *G10L 15/22* (2013.01); *H04W 4/80* (2018.02)

(58) Field of Classification Search
CPC ... G10L 15/22; G10L 15/02; G10L 2015/225; H04W 4/80; H04W 12/06; G06F 3/167
See application file for complete search history.

(56) References Cited

U.S. PATENT DOCUMENTS

| | | |
|---|---|---|
| 9,324,322 B1 | 4/2016 | Torok et al. |
| 9,401,140 B1 | 7/2016 | Weber et al. |
| 9,484,030 B1 | 11/2016 | Meaney et al. |
| 9,672,812 B1 | 6/2017 | Watanabe et al. |
| 2016/0196560 A1* | 7/2016 | Nolan ............... H05B 47/12 700/94 |
| 2021/0272058 A1* | 9/2021 | Kourtis ............ G16H 20/13 |

OTHER PUBLICATIONS

[Online] "Samsung Galaxy Buds Quick Pairing Process Demo"—YouTube, https://www.youtube.com/watch?v=0SN9YaxMe14&ab_channel=RichDeMuro, Feb. 25, 2019, 3 pages.

* cited by examiner

*Primary Examiner* — Omeed Alizada
(74) *Attorney, Agent, or Firm* — Nixon & Vanderhye, P.C.

(57) ABSTRACT

A method, performed by an electronic device, of controlling an external device using a sound signal includes: obtaining the sound signal generated based on a packaging material of the external device being unpacked; obtaining identification information of the external device and operation information about an operation between the electronic device and the external device based on the obtained sound signal; receiving an identification value of the external device from the external device based on the external device being turned on; establishing a communication connection with the external device based on the identification value of the external device received from the external device and the identification information obtained from the sound signal; and transmitting, through the communication connection, based on the operation information, to the external device, data for an operation of the external device.

20 Claims, 17 Drawing Sheets

FIG. 2
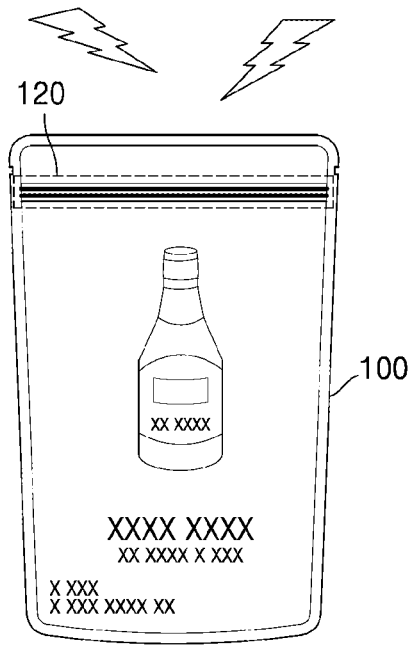
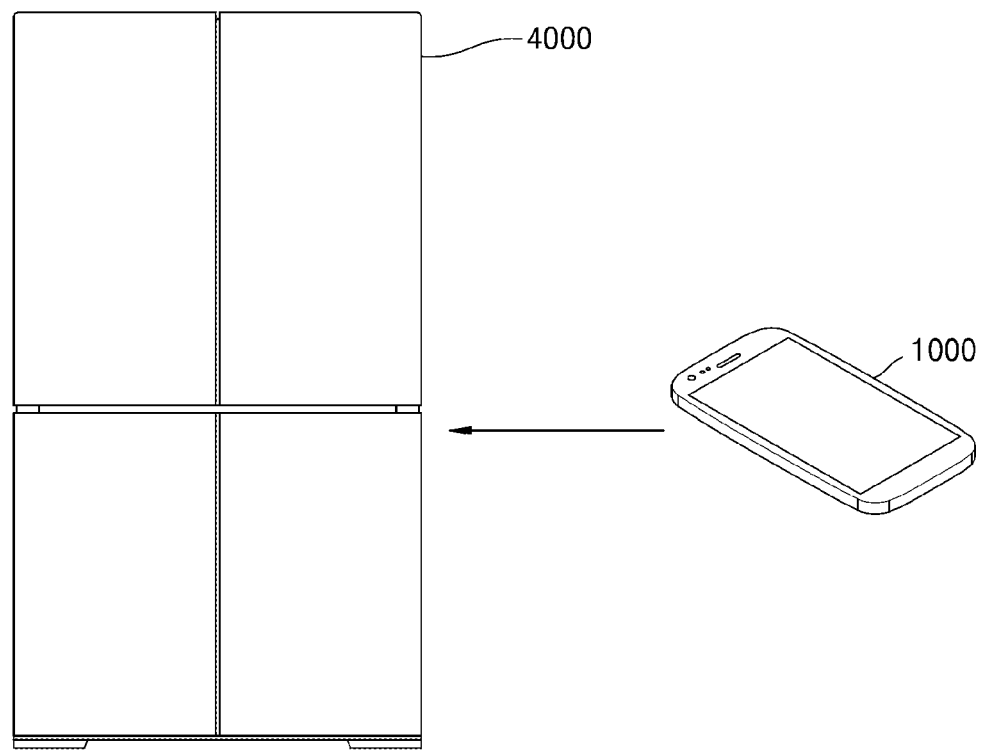

ELECTRONIC DEVICE AND OPERATING METHOD THEREOF

CROSS-REFERENCE TO RELATED APPLICATION

This application is based on and claims priority under 35 U.S.C. § 119 to Korean Patent Application No. 10-2021-0117945, filed on Sep. 3, 2021, in the Korean Intellectual Property Office, the disclosure of which is incorporated by reference herein in its entirety.

BACKGROUND

Field

The disclosure relates to an electronic device that controls an external device using a sound signal and an operating method thereof.

Description of Related Art

According to recent developments in technology, a device may provide various functions by recognizing a voice or sound signal. For example, the device may recognize a user's voice through natural language processing, and may provide information to a user or control another device according to recognized content. In addition, the device may recognize an alarm or sound output from a home appliance device, and provide information or a service suitable for a situation of the user.

Meanwhile, as functions that may be provided through a communication connection with other devices increase, a case in which the user needs to establish a communication connection between a device already owned by the user and a new device is increasing. In addition, in order to use a service provided by a service provider, a case in which the user needs to input service account information into the user's own devices is increasing. In addition, as the functions provided by the device increase, settings information that needs to be established after purchasing the device also increases. After the user purchases the device, the user has to perform cumbersome tasks such as establishing a communication connection, establishing service account information, or establishing environment settings.

Therefore, there is a demand for a method of automatically establishing such settings after the device is purchased and then unpacked. In addition, in a case of not only the device but also a product of which an expiration date or opening date is important, such as food, a method of automatically managing the expiration date or the opening date is also required.

SUMMARY

Embodiments of the disclosure provide an electronic device that controls an external device using a sound signal of a packaging material of the external device and an operating method thereof.

Embodiments of the disclosure also provide an electronic device that manages a product using a sound signal of a packaging material of the product and an operating method thereof.

According to an example embodiment of the disclosure, there is provided a method, performed by an electronic device, of controlling an external device using a sound signal including: obtaining the sound signal generated based on a packaging material of the external device being unpacked; obtaining identification information of the external device and operation information about an operation between the electronic device and the external device based on the obtained sound signal; receiving an identification value of the external device from the external device based on the external device being turned on; establishing a communication connection with the external device based on the identification value of the external device received from the external device and the identification information obtained from the sound signal; and through the communication connection, based on the operation information, transmitting data for an operation of the external device to the external device.

According to another example embodiment of the disclosure, there is provided an electronic device including: a communicator comprising communication circuitry; a microphone; at least one memory storing one or more instructions; and at least one processor configured, by executing the one or more instructions, to: receive a sound signal generated based on a packaging material of an external device being unpacked through the microphone; obtain identification information of the external device and operation information about an operation between the electronic device and the external device based on the received sound signal; receive an identification value of the external device from the external device through the communicator based on the external device being turned on; establish a communication connection with the external device based on the identification value of the external device received from the external device and the obtained identification information; and through the communication connection, based on the operation information, transmit data for an operation of the external device to the external device.

According to another example embodiment of the disclosure, there is provided a non-transitory computer-readable recording medium having recorded thereon a computer program for executing, on a computer, a method by which an electronic device controls an external device using a sound signal.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 2 is a diagram illustrating an example method, performed by an electronic device, of obtaining information of a product in a packaging material based on a sound signal of the packaging material, according to various embodiments;

DETAILED DESCRIPTION

Figure 1:
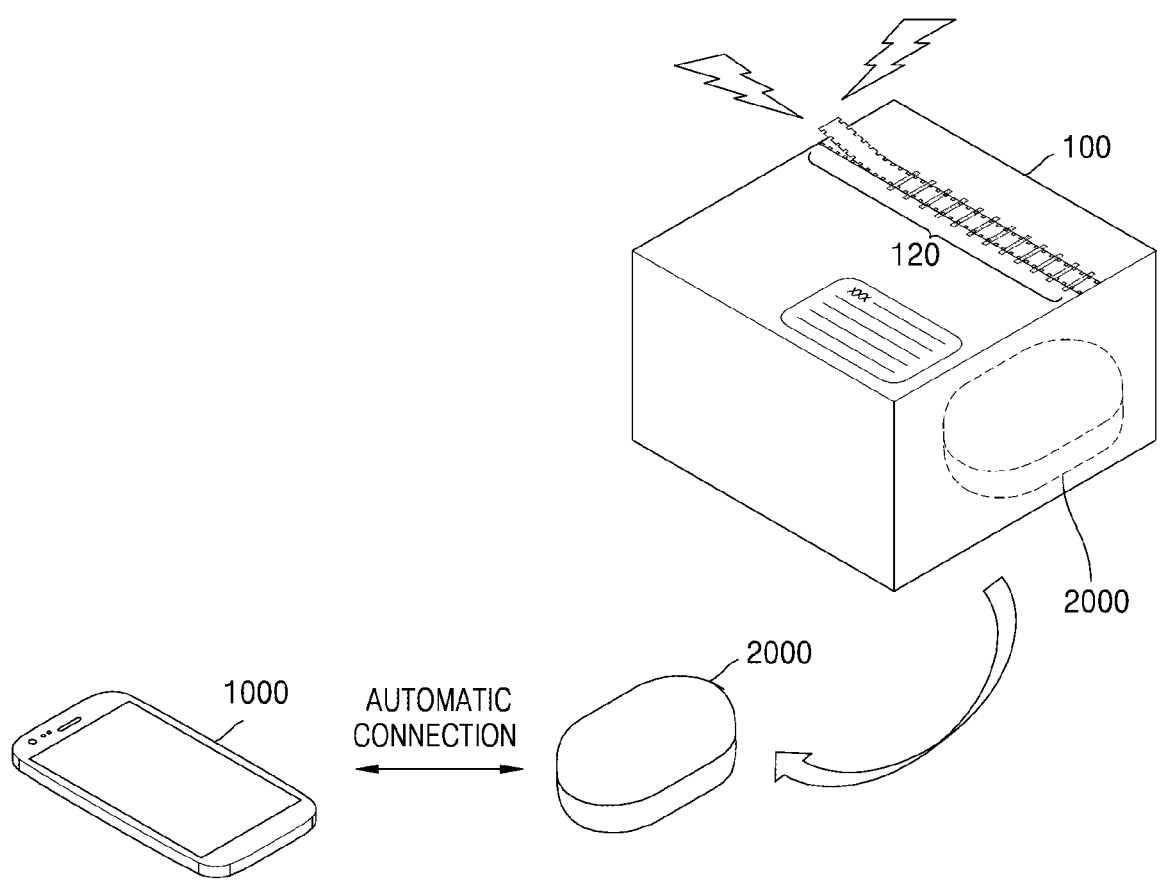
FIG. 1 is a diagram illustrating an example in which an electronic device obtains information of a product based on a sound signal of a packaging material of the product, according to various embodiments.

Throughout the disclosure, the expression "at least one of a, b or c" indicates only a, only b, only c, both a and b, both a and c, both b and c, all of a, b, and c, or variations thereof.

Embodiments of the disclosure will be described in greater detail below. The disclosure may, however, be embodied in many different forms and should not be construed as being limited to the various example embodiments set forth herein. Parts in the drawings unrelated to the detailed description may be omitted to ensure clarity of the disclosure. Like reference numerals in the drawings denote like elements.

Throughout the disclosure, it will be understood that when an element is referred to as being "connected" to another element, it may be "directly connected" to the other element or "electrically connected" to the other element with intervening elements therebetween. It will be understood that when an element is referred to as "including" another element, the element may further include other elements unless mentioned otherwise.

Hereinafter, the disclosure will be described in greater detail with reference to the accompanying drawings.

FIG. 1 is a diagram illustrating an example in which an electronic device 1000 obtains information of a product 2000 based on a sound signal of a packaging material 100 of the product, according to various embodiments.

Referring to FIG. 1, the product 2000 may be an external device capable of establishing a communication connection with the electronic device 1000. The product 2000 may include items such as food, medicine, or cosmetics, but is not limited thereto. The packaging material 100 may be a packaging box, a packaging bag, or a packaging paper, but is not limited thereto.

According to an embodiment of the disclosure, the packaging material 100 may include a zipper 120 for opening the packaging material 100. When a user removes the zipper 120, the sound signal may be generated. The sound signal may be previously designed based on a design such as punching size or punching arrangement of the zipper 120 to indicate information about the product 2000 in the packaging material 100.

As the user unpacks the packaging 100, the previously designed sound signal may be generated, and the electronic device 1000 may receive the generated sound signal, and obtain the information about the product 2000 in the packaging material 100 based on the received sound signal.

The information about the product 2000 may include at least one of identification information of the product 2000, operation information of the product 2000, authentication information of the product 2000, expiration date information of the product 2000, or expiration date information of the product 2000 after opening, but is not limited thereto.

Referring to FIG. 1, as the user removes the zipper 120, the electronic device 1000 may obtain the sound signal. The electronic device 1000 may obtain information about the external device 2000 in the packaging material 100 based on the sound signal.

As a power button of the external device 2000 is pressed by the user after the packaging material 100, which may, for example, be a paper box, is opened, the external device 2000 may be driven.

As the external device 2000 is turned on, the electronic device 1000 may establish a communication connection with the external device 2000 based on the obtained information about the external device 2000. The electronic device 1000 may transmit data to the external device 2000 or control the external device 2000 through the communication connection.

Accordingly, the electronic device 1000 and the newly purchased external device 2000 may be connected by the user performing an operation of unpacking the packaging material 100, without a separate work of the user or with minimal manipulation. In addition, environment settings data, user data, etc. may be automatically stored in the external device 2000.

FIG. 2 is a diagram illustrating an example method, performed by the electronic device 1000, of obtaining information of a product in the packaging material 100 based on a sound signal of the packaging material 100, according to various embodiments.

Referring to FIG. 2, the product may be food packaged by the packaging material 100. The electronic device 1000 may receive the sound signal as a user removes the zipper 120. The electronic device 1000 may obtain identification information, material information, and expiration date information of the product based on the sound signal.

The electronic device 1000 may store the obtained information of the product or transmit information of the product to another device 4000 that stores the product, such as, for example, and without limitation, a refrigerator.

The electronic device 1000 may help the user to manage the product by providing expiration date information or opening date information of the product.

Figure 3:
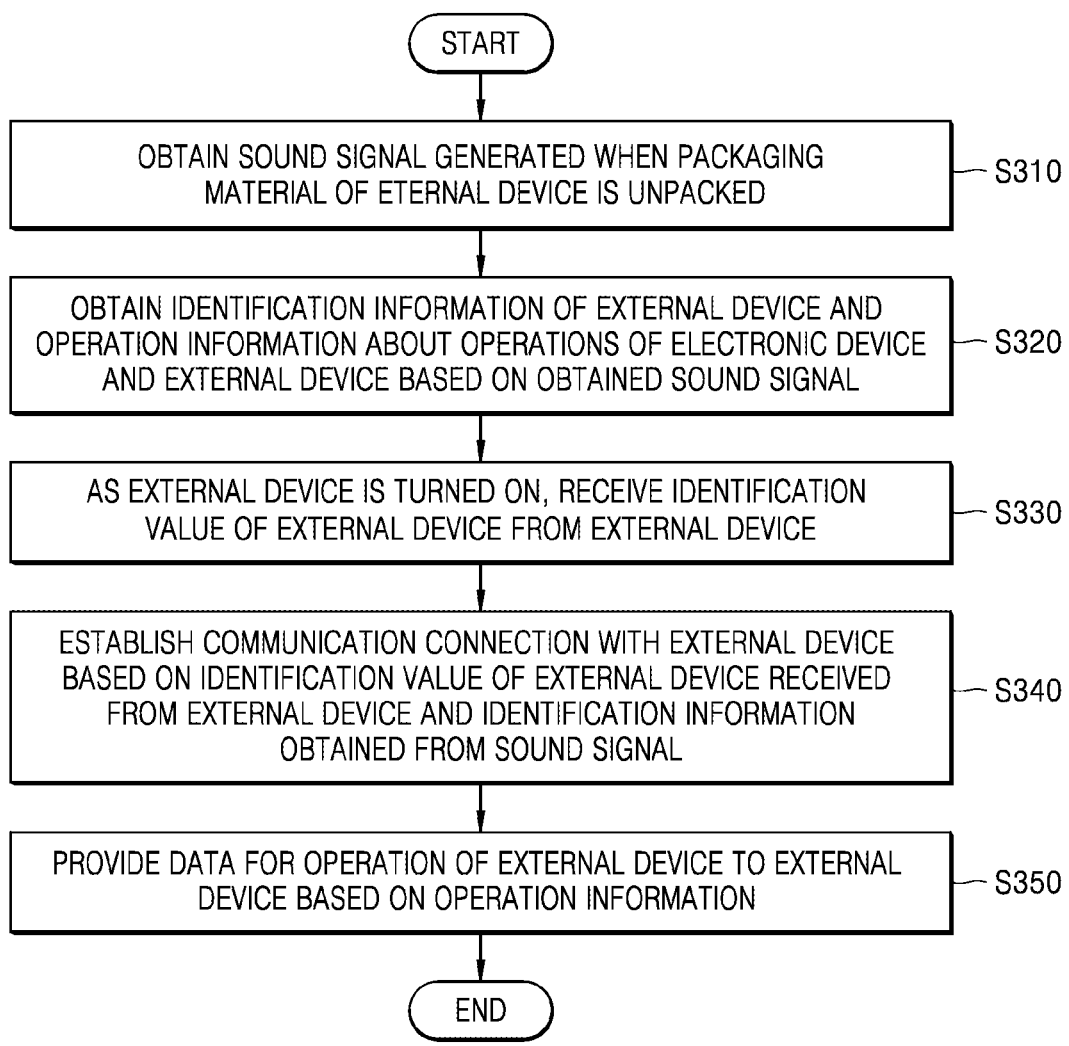
FIG. 3 is a flowchart illustrating an example method, performed by an electronic device, of controlling an external device based on a sound signal of a packaging material of the external device, according to various embodiments

FIG. 3 is a flowchart illustrating an example method, performed by the electronic device 1000, of controlling the external device 2000 based on a sound signal of the packaging material 100 of the external device 2000, according to various embodiments.

In operation S310, the electronic device 1000 may obtain the sound signal generated when the packaging material 100 of the packaged external device 2000 is unpacked.

The sound signal may include a plurality of element sound signals. The element sound signal may exhibit an intrinsic sound characteristic. The sound characteristic may include a frequency characteristic and an amplitude characteristic, but is not limited to.

In addition, the electronic device 1000 may directly receive the sound signal by which the packaging material 100 is unpacked or may receive the sound signal from another device such as an artificial intelligence speaker connected to the electronic device 1000.

According to an embodiment of the disclosure, the electronic device 1000 does not receive the sound signal but may receive only information about the external device 2000 from a server upon transmitting a sound signal received by another device to the server. In this case, the electronic device 1000 and the other device may be devices registered in the server by the same user account.

In operation S320, the electronic device 1000 may obtain identification information of the external device 2000 and operation information about operations of the electronic device 1000 and the external device 2000 based on the obtained sound signal.

According to an embodiment of the disclosure, the electronic device 1000 may determine at least one of the identification information or the operation information of the external device 2000 based on the sound characteristics represented by the plurality of element sound signals and an order of the plurality of element sound signals.

According to an embodiment of the disclosure, the sound signal may include a trigger sound signal informing that the unpacking of the packaging material 100 of the external device 2000 has started. As detecting the trigger sound signal, the electronic device 1000 may obtain the identification information and the operation information of the external device 2000 from a sound signal received after the trigger sound signal.

According to an embodiment of the disclosure, the electronic device 1000 may transmit the obtained sound signal to the server and may receive at least one of the identification information or the operation information of the external device 2000 from the server.

According to an embodiment of the disclosure, the identification information may include, for example, a serial number of the external device 2000, a model name of the external device 2000, a name of the external device 2000, a type of the external device 2000, and International mobile equipment identity (IMEI) information, but is not limited thereto.

According to an embodiment of the disclosure, the operation information is information about operations need to be performed between the external device 2000 and the electronic device 1000 and may include, for example, and without limitation, Bluetooth pairing, network settings, user account settings, and user data synchronization. The operation information may include language settings and accessibility settings, but is not limited thereto.

According to an embodiment of the disclosure, the electronic device 1000 may obtain only the operation information from the sound signal without obtaining the identification information of the external device 2000. According to an embodiment of the disclosure, the electronic device 1000 may obtain not only the identification information and the operation information, but also authentication information.

According to an embodiment of the disclosure, as obtaining the identification information and the operation information of the external device 2000, the electronic device 1000 may activate a short-range communicator (e.g., including communication circuitry) for a short-range wireless communication connection, such as Wi-Fi or Bluetooth, with the external device 2000. Upon activating the short-range communicator, the electronic device 1000 may operate in a listening mode in which an advertisement signal requesting the short-range communication connection is received from a peripheral device.

The electronic device 1000 may store the obtained identification information and operation information of the external device 2000 in a memory.

In operation S330, when the external device 2000 is turned on, the electronic device 1000 may receive an identification value of the external device 2000 from the external device 2000.

As the user presses a power button of the external device 2000, the external device 2000 may broadcast the advertisement signal requesting the short-range communication connection. Accordingly, the electronic device 1000 may receive the advertisement signal from the external device 2000. Upon receiving the advertisement signal, the electronic device 1000 may request the identification value of the external device 2000 from the external device 2000 based on the advertisement signal, and receive the identification value of the external device 2000 from the external device 2000.

The identification value of the external device 2000 may include, for example, the serial number of the external device 2000, the model name of the external device 2000, the name of the external device 2000, the type of the external device 2000, and the IMEI information, but is not limited thereto.

In operation S340, the electronic device 1000 may establish a communication connection with the external device 2000 based on the identification value of the external device 2000 received from the external device 2000 and the identification information obtained from the sound signal.

According to an embodiment of the disclosure, the electronic device 1000 may compare the identification value of the external device 2000 received from the external device 2000 with the identification information obtained from the sound signal, and when the identification value and the identification information indicate the same external device 2000, establish the communication connection with the external device 2000.

Also, according to an embodiment of the disclosure, the electronic device 1000 may receive the operation information from the sound signal and may not obtain the identification information of the external device 2000. In this case, the electronic device 1000 may establish the communication connection with the external device 2000 upon receiving the identification value from the external device 2000 requesting the short-range communication connection.

According to an embodiment of the disclosure, the electronic device 1000 may obtain the authentication information as well as the identification information and the operation information from the sound signal. In this case, the electronic device 1000 may establish the communication connection with the external device 2000 by transmitting the authentication information to the external device 2000 upon receiving a request for the authentication information from the external device 2000.

In operation S350, the electronic device 1000 may provide data for the operation of the external device 2000 to the external device 2000 based on the operation information.

When the communication connection between the electronic device 1000 and the external device 2000 is established, the electronic device 1000 may provide the data for the operation of the external device 2000 to the external device 2000 based on the operation information.

When the operation information indicates Bluetooth pairing, the electronic device 1000 may store information about establishing the communication connection with the external device 2000.

When the operation information indicates network settings, the electronic device 1000 may transmit, to the external device 2000, at least one of authentication information about an access point of a network or account information of a user of a device with respect to an external server.

When the operation information indicates user data synchronization, the electronic device 1000 may transmit user data such as contacts, schedule, and photos to the external device 2000.

When the operation information indicates pairing between the external device 2000 and another device, the electronic device 1000 may transmit the identification information and the operation information of the external device 2000 to the other device.

According to an embodiment of the disclosure, the operation information may include, for example, a type of the electronic device 1000 corresponding to an operation. For example, the operation information may include a mobile phone as a device corresponding to user data synchronization. Accordingly, when the mobile phone obtains the sound signal, user data synchronization with the external device 2000 is performed, but when a TV obtains the sound signal, user data synchronization with the external device 2000 may not be performed.

According to an embodiment of the disclosure, the operation information may include the operation corresponding to the type of the electronic device 1000. For example, the operation information may include an operation of transmitting the sound signal itself or information obtained from the sound signal to the mobile phone in correspondence to the artificial intelligence speaker, and may include a Bluetooth pairing operation in correspondence to the mobile phone.

According to an embodiment of the disclosure, the operation information may include a plurality of operations and a type of the device corresponding to each of the plurality of operations. Accordingly, when the plurality of devices simultaneously obtain the sound signal, a first operation may be performed by a first device and a second operation may be performed by a second device.

For example, among user data managed by personal information management software (PIMS), a smart phone may correspond to an operation of sharing contacts or schedule, and a smart refrigerator may correspond to an operation of sharing family schedule.

According to an embodiment of the disclosure, the electronic device 1000 may obtain category information of the product 2000 in the packaging material 100 based on the sound signal. The category information may include the category information of the product 2000 such as, for example, and without limitation, food, medicine, cosmetics, or a device. In addition, the category information may include information and a model name of the type of the device such as, for example, and without limitation, earphone, speaker, TV or smartphone, and may include information about a type of food such as, for example, and without limitation, snack, yogurt, jelly, meat or fish.

According to an embodiment of the disclosure, the electronic device 1000 may obtain identification information, expiration date information, or use-by date information of the product 2000 based on the received sound signal. In addition, the electronic device 1000 may store at least one of the expiration date information and the use-by date information obtained in correspondence to the identification information of food, or opening date information about a date when the packaging material 100 is unpacked. The electronic device 1000 may, for example, transmit, to the refrigerator, at least one of the expiration date information, the use-by date information, or the opening date information along with the identification information of the food.

According to an embodiment of the disclosure, the electronic device 1000 may determine whether to receive the sound signal or to perform the operation information obtained from the sound signal based on contextual information for security. The contextual information may, for example, include 'when' or 'where', but is not limited thereto. For example, when the electronic device 1000 is at user's home, the electronic device 1000 may receive the sound signal without any restrictions and perform an operation corresponding to the operation information. When the electronic device 1000 is in a public transport, the electronic device 1000 may not obtain the sound signal or not perform the operation corresponding to the operation information. In addition, when the electronic device 1000 is in markets and shops, the electronic device 1000 may obtain the sound signal but not perform the operation corresponding to the operation information without user's approval. When the electronic device 1000 is in an office, the electronic device 1000 may not obtain the sound signal.

Figure 4:
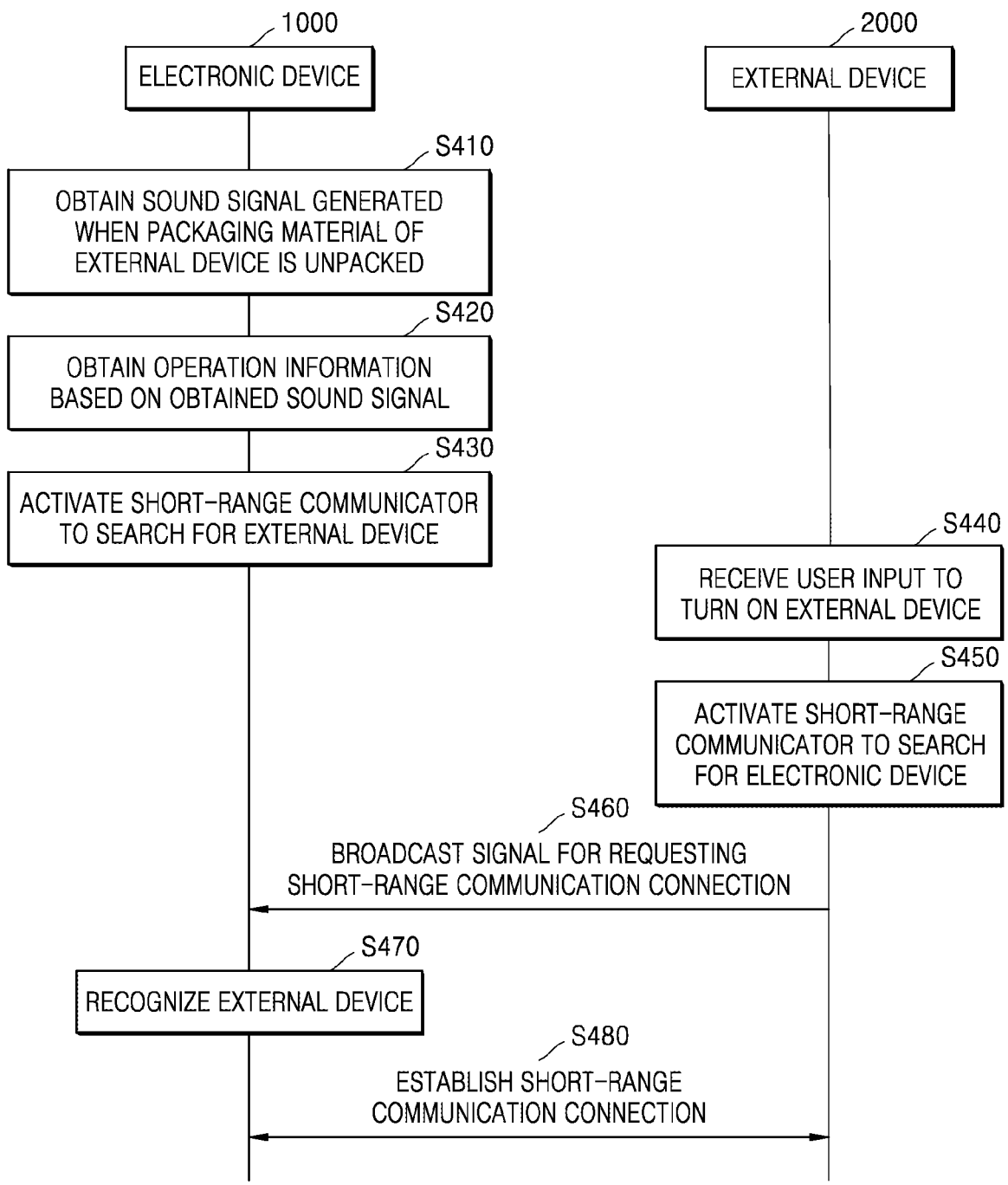
FIG. 4 is a signal flow diagram illustrating an example method, performed by an electronic device, of controlling an external device based on a sound signal of a packaging material of the external device, according to various embodiments.

FIG. 4 is a signal flow diagram illustrating an example method, performed by the electronic device 1000, of controlling the external device 2000 based on a sound signal of the packaging material 100 of the external device 2000, according to various embodiments.

In operation S410, the electronic device 1000 may obtain the sound signal generated when the packaging material 100 of the external device 2000 is unpacked. In operation S420, the electronic device 1000 may obtain operation information based on the obtained sound signal. Operations S410 and S420 may be respectively described with reference to operations S310 and S320 of FIG. 3.

In operation S430, the electronic device 1000 may activate a short-range communicator to search for the external device 2000.

When the operation information includes establishing a short-range communication connection between the electronic device 1000 and the external device 2000, the electronic device 1000 may activate the short-range communicator for retrieving the external device 2000.

The operation information may include information about a communication standard of short-range communication. Accordingly, the electronic device 1000 may activate a communication module that performs short-range wireless communication according to the communication standard included in the operation information among a plurality of short-range communicators based on the communication standard included in the operation information.

The short-range communicator may include a communication module including various communication circuitry that performs short-range wireless communication according to at least one communication standard of Bluetooth, Wi-Fi, Bluetooth Low Energy (BLE), NFC/RFID, Wi-Fi Direct, UWB, or ZIGBEE.

Upon activating the short-range communicator, the electronic device 1000 may receive data from a peripheral device according to the communication standard included in the operation information in order to confirm whether there is the external device 2000 requesting the connection.

In operation S440, the external device 2000 may receive a user input to turn on the external device 2000.

In operation S450, the external device 2000 may activate the short-range communicator to search for the electronic device 1000.

The short-range communicator may be the communication module that performs short-range wireless communication according, for example, and without limitation, to at least one communication standard of Bluetooth, Wi-Fi, Bluetooth Low Energy (BLE), NFC/RFID, Wi-Fi Direct, UWB, or ZIGBEE.

The external device 2000 may activate the short-range communicator whenever the external device 2000 is turned on even though there is no user input. Also, the external device 2000 may automatically activate the short-range communicator only when the external device 2000 is first turned on after shipment.

In operation S460, the external device 2000 may broadcast a signal for requesting the short-range communication connection.

After the external device 2000 is turned on, as the external device 2000 is driven, the external device 2000 may activate the short-range communicator and broadcast an advertisement signal requesting the short-range communication connection.

According to an embodiment of the disclosure, the external device 2000 may broadcast the advertisement signal after the external device 2000 is first turned on after shipment, and may not broadcast the advertisement signal when the external device 2000 is subsequently turned on. Accordingly, after the user turns on the external device 2000 for the first time after purchasing the external device 2000, the external device 2000 may broadcast the advertisement signal for establishing the short-range communication connection even without a separate user input.

According to an embodiment of the disclosure, after the external device 2000 is turned on, upon receiving a user input for establishing the short-range wireless communication connection with the electronic device 1000, the external device 2000 may broadcast the advertisement signal for requesting the short-range communication connection.

The advertisement signal may include information indicating that the advertisement signal is a signal for requesting the short-range wireless communication connection and a physical layer address of the external device 2000.

According to an embodiment of the disclosure, the external device 2000 may transmit an identification value of the external device 2000 in addition to the advertisement signal. The identification value of the external device 2000 may include at least one of a name, a model name, or a device type of the external device 2000, but is not limited thereto.

In operation S470, the electronic device 1000 may recognize the external device 2000.

The electronic device 1000 may recognize the external device 2000 by storing data included in the advertisement signal and the identification value of the external device 2000.

In operation S480, the electronic device 1000 may establish the short-range communication connection with the external device 2000.

When the electronic device 1000 establishes the short-range communication connection based on the operation information obtained from the sound signal, the electronic device 1000 may establish an encrypted short-range communication connection with the external device 2000 without a separate user confirmation. Accordingly, after the packaging material 100 of the external device 2000 is removed, the encrypted short-range communication connection between the external device 2000 and the electronic device 1000 may be established even without a separate user input.

As an embodiment of the disclosure, the electronic device 1000 may display a user confirmation window inquiring whether to establish the short-range communication connection with the found external device 2000. In this case, the electronic device 1000 may establish the short-range communication connection with the external device 2000 only when receiving a user input for establishing the short-range communication connection with the external device 2000.

The electronic device 1000 may transmit data for an operation of the external device 2000 based on the operation information.

Figure 5:
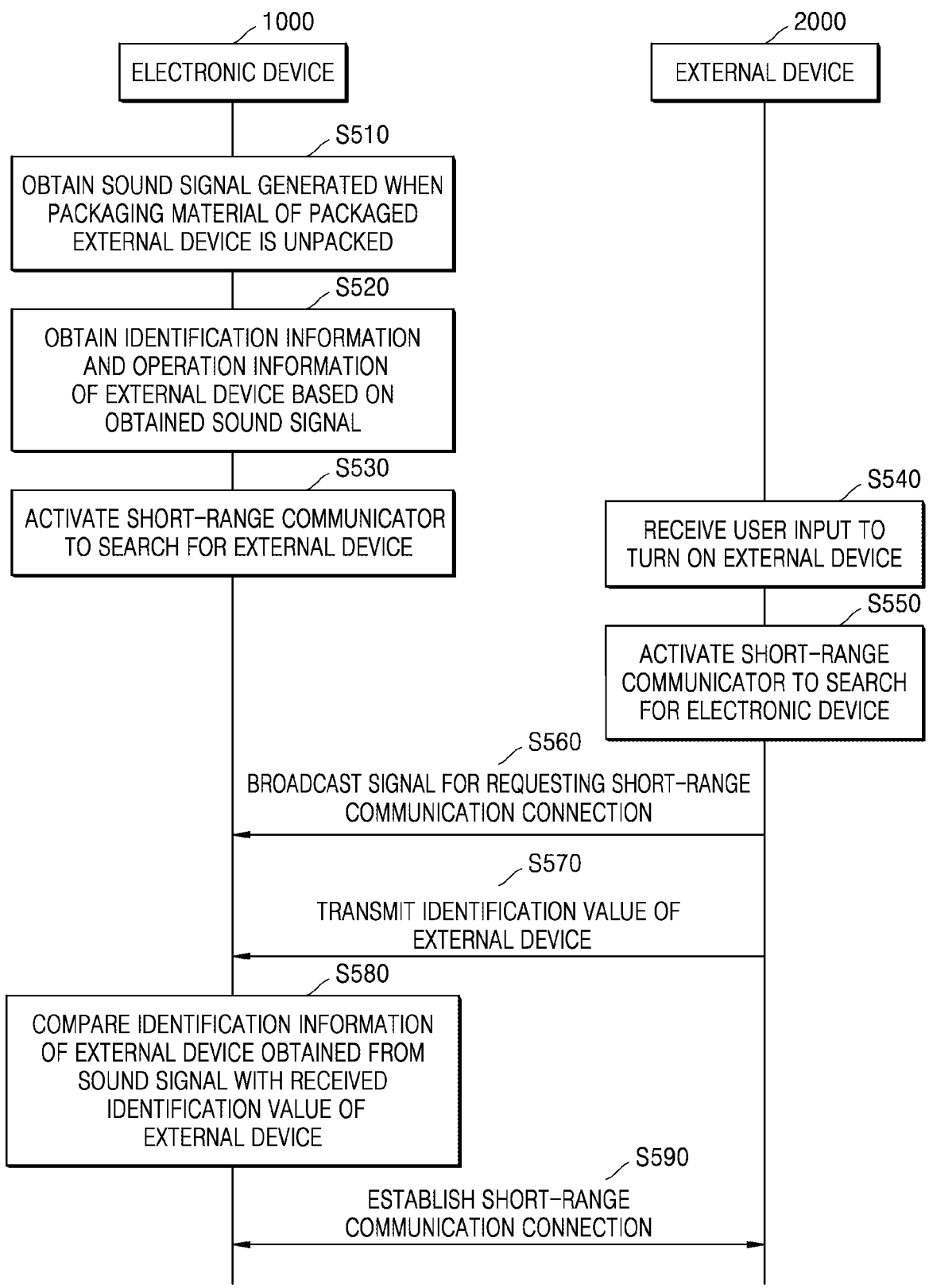
FIG. 5 is a signal flow diagram illustrating an example method, performed by an electronic device, of controlling an external device based on a sound signal of a packaging material of the external device, according to various embodiments.

FIG. 5 is a signal flow diagram illustrating an example method, performed by the electronic device 1000, of controlling the external device 2000 based on a sound signal of the packaging material 100 of the external device 2000, according to an embodiment of the disclosure.

In operation S510, the electronic device 1000 may obtain the sound signal generated when the packaging material 100 of the packaged external device 2000 is unpacked. In operation S520, the electronic device 1000 may obtain identification information and operation information of the external device 2000 based on the obtained sound signal. Operations S510 and S520 may be respectively described with reference to operations S310 and S320 of FIG. 3.

In operation S530, the electronic device 1000 may activate a short-range communicator to search for the external device 2000. In operation S540, the external device 2000 may receive a user input to turn on the external device 2000. In operation S550, the external device 2000 may activate the short-range communicator to search for the electronic device 1000. In operation S560, the external device 2000 may broadcast a signal for requesting the short-range communication connection. Operations S530 to S560 may be respectively described with reference to operations S430 and S460 of FIG. 4.

In operation S570, the external device 2000 may transmit an identification value of the external device 2000 to the electronic device 1000.

The electronic device 1000 may request the identification value of the external device 2000 from the external device 2000 based on an advertisement signal. Upon receiving a request for the identification value, the external device 2000 may transmit the identification value of the external device 2000 to the electronic device 1000. Also, operation S570 may be described with reference to operation S330 of FIG. 3.

In operation S580, the electronic device 1000 may compare the identification information of the external device 2000 obtained from the sound signal with the received identification value of the external device 2000.

The electronic device 1000 may compare the identification information of the external device 2000 obtained from the sound signal with the received identification value of the external device 2000 to determine whether the identification information and the identification value indicate the same external device 2000.

In operation S590, the electronic device 1000 may establish a short-range communication connection with the external device 2000.

When the identification information of the external device 2000 obtained from the sound signal and the received identification value of the external device 2000 indicate the same external device 2000, the electronic device 1000 may establish the short-range communication connection with the external device 2000.

In this case, the electronic device 1000 may establish an encrypted short-distance communication connection with the external device 2000 without a separate user confirmation. For example, when both the obtained identification information of the external device 2000 and the received identification value of the external device 2000 are the same as a name of Bluetooth earphones, "Galaxy Buds", the electronic device 1000 may establish the encrypted short-distance communication connection with the external device 2000 without a separate user confirmation. For another example, when both the obtained identification information of the external device 2000 and the received identification value of the external device 2000 are the same as a model name of the Bluetooth earphones, "SM-R190N", the electronic device 1000 may establish the encrypted short-distance communication connection with the external device 2000 without a separate user confirmation.

Accordingly, after the packaging material 100 of the external device 2000 is removed, the encrypted short-range communication connection between the external device 2000 and the electronic device 1000 may be established even without a separate user input.

According to an embodiment of the disclosure, even when the obtained identification information of the external device 2000 and the received identification value of the external device 2000 are the same, the electronic device 1000 may display a user confirmation window inquiring whether to establish the short-range communication connection with the found external device 2000. In this case, the electronic device 1000 may establish the short-range communication connection with the external device 2000 only when receiving a user input for establishing the short-range communication connection with the external device 2000.

The electronic device 1000 may transmit data for an operation of the external device 2000 based on the operation information.

Figure 6:
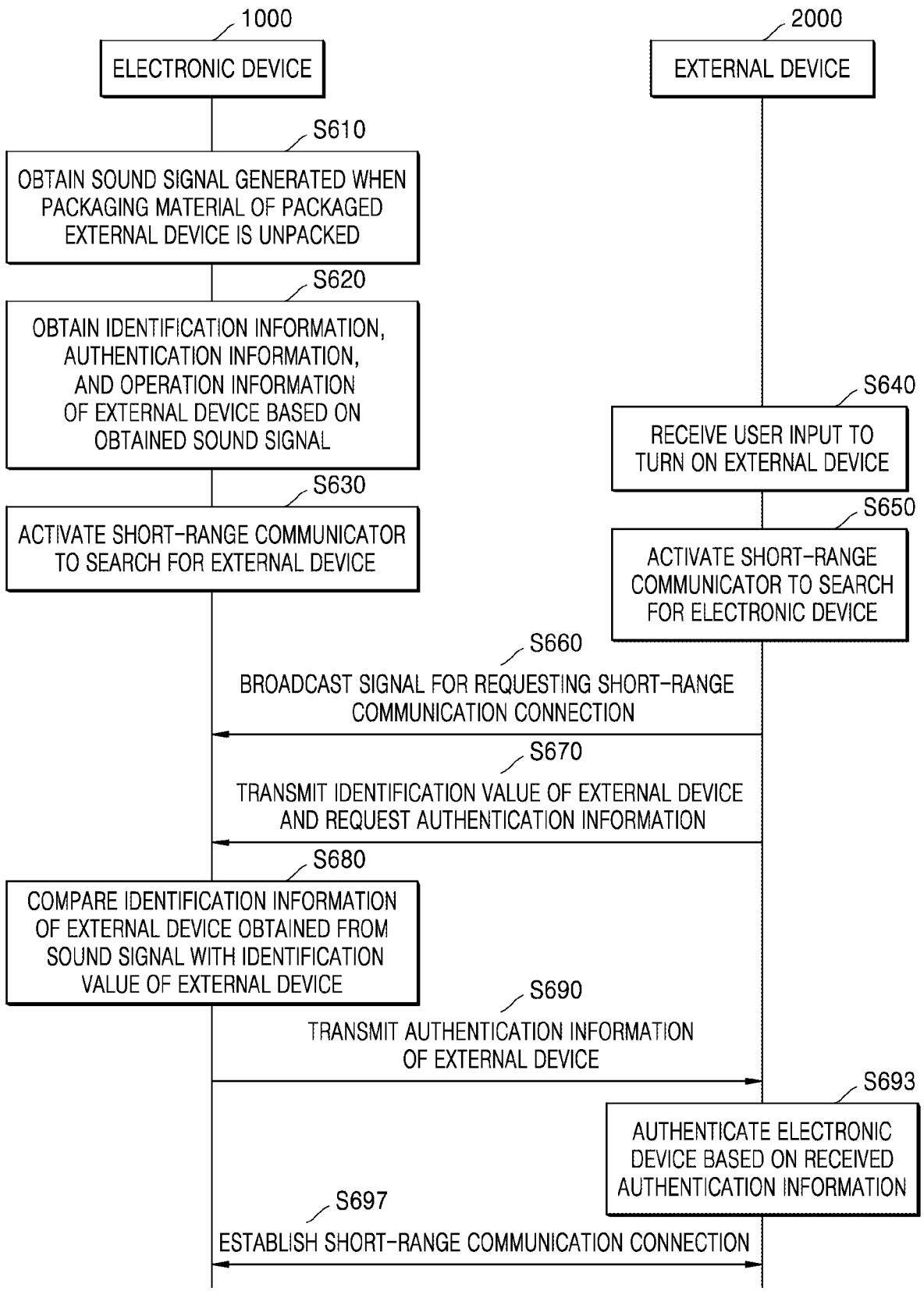
FIG. 6 is a signal flow diagram illustrating an example method, performed by an electronic device, of controlling an external device based on a sound signal of a packaging material of the external device, according to various embodiments.

FIG. 6 is a signal flow diagram illustrating an example method, performed by the electronic device 1000, of controlling the external device 2000 based on a sound signal of the packaging material 100 of the external device 2000, according to various embodiments.

In operation S610, the electronic device 1000 may obtain the sound signal generated when the packaging material 100 of the packaged external device 2000 is unpacked. Operation S610 may be described with reference to operation S410 of FIG. 4.

In operation S620, the electronic device 1000 may obtain identification information, authentication information, and operation information of the external device 2000 based on the obtained sound signal.

The authentication information of the external device 2000 may include at least one of an authentication number such as a PIN number or a pairing key or an authentication character, but is not limited thereto.

In operation S630, the electronic device 1000 may activate a short-range communicator to search for the external device 2000. In operation S640, the external device 2000 may receive a user input to turn on the external device 2000. In operation S650, the external device 2000 may activate the short-range communicator to search for the electronic device 1000. In operation S660, the external device 2000 may broadcast a signal for requesting the short-range communication connection. Operations S630 to S660 may be respectively described with reference to operations S430 and S460 of FIG. 4.

In operation S670, the external device 2000 may transmit an identification value of the external device 2000 to the electronic device 1000 and request the authentication information.

In operation S680, the electronic device 1000 may compare the identification information of the external device 2000 obtained from the sound signal with the received identification value of the external device 2000.

In operation S690, the electronic device 1000 may transmit the authentication information of the external device 2000 to the external device 2000.

According to an embodiment of the disclosure, upon determining that the identification information of the external device 2000 obtained from the sound signal and the received identification value of the external device 2000 are the same, the electronic device 1000 may transmit the authentication information of the external device 2000 obtained from the sound signal to the external device 2000.

According to an embodiment of the disclosure, the electronic device 1000 may display a user confirmation window inquiring whether to establish a short-range communication connection with the found external device 2000, and, only when receiving a user input for establishing the short-range communication connection with the external device 2000, transmit the authentication information to the external device 2000.

In operation S693, the external device 2000 may authenticate the electronic device 1000 based on the received authentication information.

For example, based on whether the authentication information received from the electronic device 1000 is the same as previously stored authentication information, the external device 2000 may determine whether to establish the short-distance communication connection with the electronic device 1000 that has transmitted the authentication information In operation S697, the electronic device 1000 may establish the short-range communication connection with the external device 2000.

When the authentication information received from the electronic device 1000 is the same as the previously stored authentication information, the external device 2000 may establish the short-range communication connection with the electronic device 1000.

Accordingly, after the packaging material 100 of the external device 2000 is removed, the encrypted short-range communication connection between the external device 2000 and the electronic device 1000 may be established even without a separate user input.

The electronic device 1000 may transmit data for an operation of the external device 2000 based on the operation information.

Figure 7:
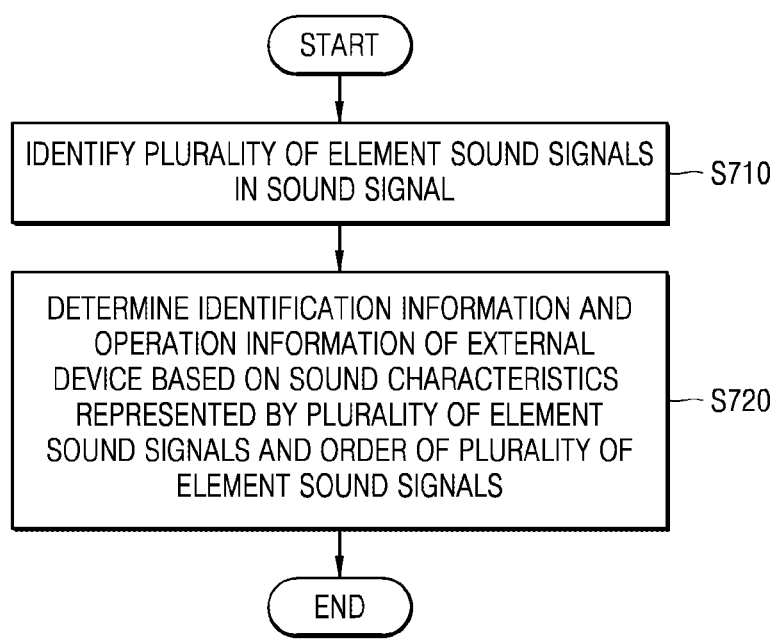
FIG. 7 is a flowchart illustrating an example method, performed by an electronic device, of obtaining information of a product from a sound signal, according to various embodiments.

FIG. 7 is a flowchart illustrating an example method, performed by the electronic device 1000, of obtaining information of the product 2000 from a sound signal, according to various embodiments.

In operation S710, the electronic device 1000 may identify a plurality of element sound signals in the sound signal.

The sound signal generated when the packaging material 100 is unpacked may include the plurality of element sound signals. The element sound signal may have an intrinsic sound characteristic. The sound characteristic may include frequency and amplitude of the sound signal. The sound characteristic of the element sound signal may be previously stored in the electronic device 1000 or a server.

Accordingly, the electronic device 1000 may identify the element sound signals based on the frequency and amplitude of the sound signal.

The packaging material 100 may include a plurality of packaging elements. The packaging element may include, for example, and without limitation, at least one of a design of a zipper, a material of the packaging material 100, a thickness of the packaging material 100, or a coating method of the packaging material 100. One packaging element may correspond to one element sound signal.

Because one packaging material 100 includes the plurality of packaging elements, the sound signal generated when the packaging material 100 is unpacked may include the plurality of element sound signals generated from the plurality of packaging elements.

In operation S720, the electronic device 1000 may determine identification information and operation information of the external device 2000 based on the sound characteristics represented by the plurality of element sound signals and an order of the plurality of element sound signals.

According to an embodiment of the disclosure, one element sound signal may correspond to one piece of information.

According to an embodiment of the disclosure, one sound event may include the plurality of element sound signals, and correspond to one piece of information.

One sound event may include the plurality of element sound signals recognized in the order. Accordingly, the electronic device 1000 may detect at least one sound event based on the sound characteristics and the order of the plurality of element sound signals, and provide information about the product 2000 based on the at least one detected sound event. The information about the product 2000 may include identification information and operation information of the external device 2000.

According to an embodiment of the disclosure, the electronic device 1000 may determine the information about the product 2000 from the sound signal using a pre-trained artificial intelligence model.

Figure 8:
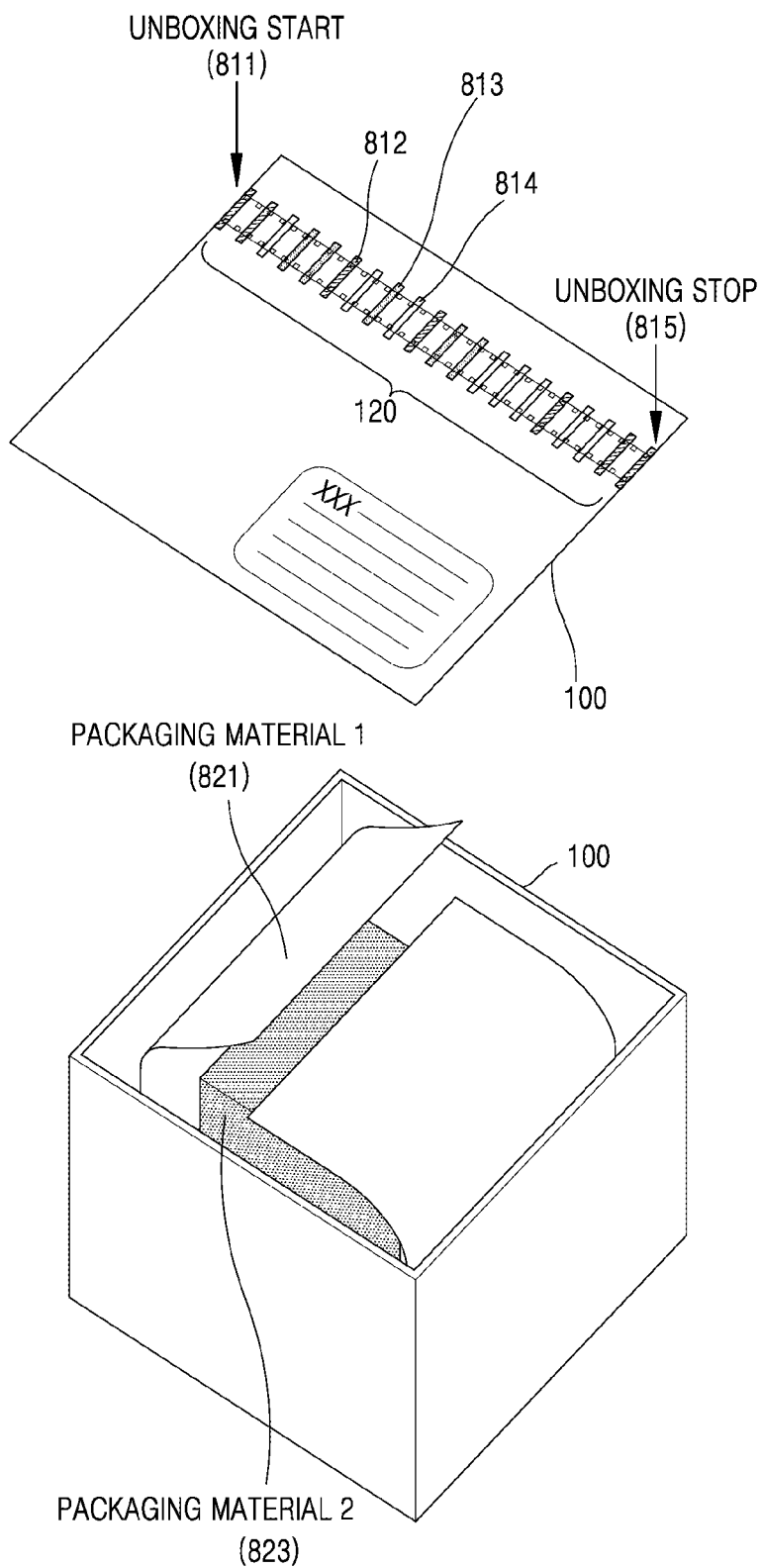
FIG. 8 is a diagram illustrating an example method, performed by an electronic device, of obtaining information of a product from a sound signal, according to various embodiments.

FIG. 8 is a diagram illustrating an example method, performed by the electronic device 1000, of obtaining information of the product 2000 from a sound signal, according to various embodiments.

Referring to FIG. 8, the packaging material 100 may, for example, be a box equipped with the zipper 120 or a paper bag equipped with the zipper 120.

The zipper 120 may include a first packaging element 812, a second packaging element 813, and a third packaging element 814. One packaging element may, for example, be designed based on a design of punching, such as punching size or punching arrangement, and the material of the zipper 120.

A first element sound signal may be generated from the first packaging element 812, and a second element sound signal may be generated from the second packaging element 813. The first element sound signal generated from the first packaging element 812 and the second element sound signal generated from the second packaging element 813 may exhibit different sound characteristics.

The electronic device 1000 may obtain the information about the product 2000 based on sound characteristics and an order of a plurality of element sound signals generated from a plurality of packaging elements.

For example, referring to FIG. 8, as a user removes the zipper 120 of the paper bag, two sound signals may be generated in the order of the first packaging element 812, the second packaging element 813, and the third packaging element 814, and the electronic device 1000 may obtain the information about the product 2000 in the paper bag based on the sound characteristics and the order of the generated element sound signals.

The zipper 120 may include a start part 811 and a stop part 815. The start part 811 may be marked with a phrase or symbol indicating that the start part 811 is a start part to start when the zipper 120 is removed.

According to an embodiment of the disclosure, the packaging material 100 may include packaging papers 821 and 823 capable of packaging the product 2000, such as, for example, and without limitation, paper, vinyl, Styrofoam, bubble foil, packaging tape, etc.

According to materials of the packaging papers 821 and 823, sound characteristics of the sound signal generated by movement of the packaging papers 821 and 823 may be different from each other. Accordingly, the materials of the packaging papers 821 and 823 may be one packaging element. In addition, according to thicknesses of the packaging papers 821 and 823 or a coating method of surfaces of the packaging papers 821 and 823, because the sound characteristics of the sound signal generated from the packaging papers 821 and 823 are different, the thicknesses of the packaging papers 821 and 823 or the coating method of surfaces of the packaging papers 821 and 823 may also be one packaging element.

The electronic device 1000 may receive the first element sound signal generated when the box 100 is opened, receive the second element sound signal generated when the first packaging paper 821 in the box is removed, and receive a third element sound signal generated when the second packaging paper 823 inside the first packaging paper 821 is removed. The electronic device 1000 may obtain the information about the product 2000 in the box 100 based on the sound characteristics and the order of the first sound signal, the second sound signal, and the third sound signal.

In addition, according to an embodiment of the disclosure, the packaging material 100 may include, for example, a can, a plastic box, or a plastic bottle, but is not limited thereto.

Figure 9:
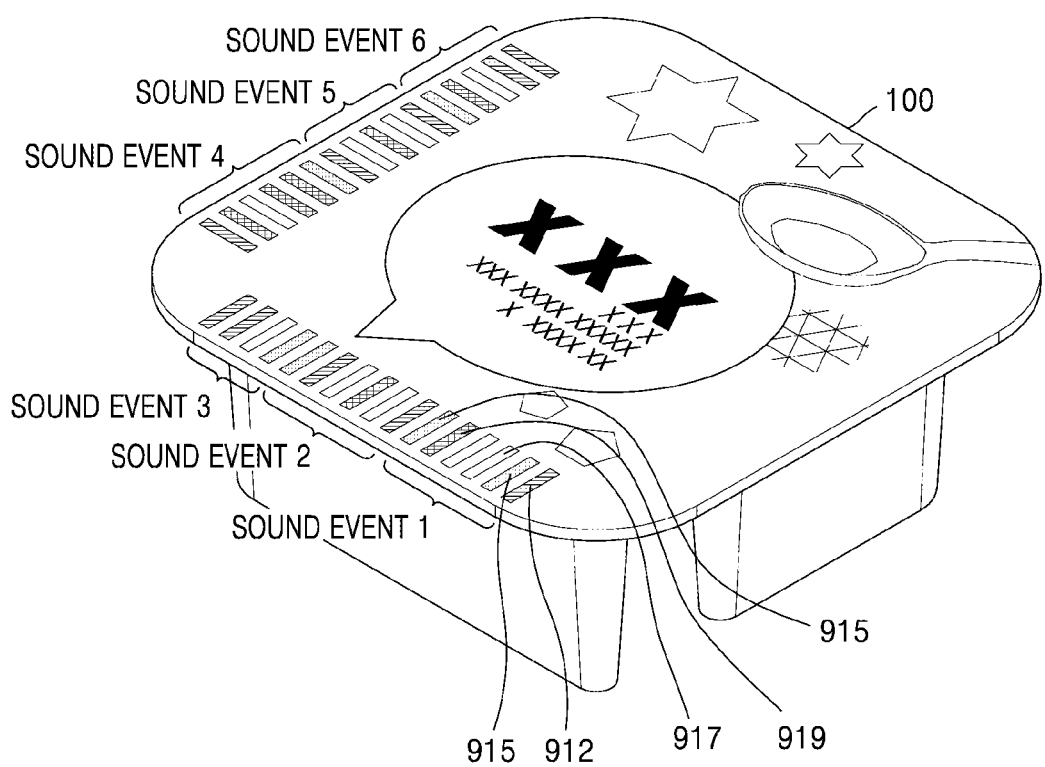
FIG. 9 is a diagram illustrating an example method, performed by an electronic device, of obtaining information of a product from a sound signal, according to various embodiments.

FIG. 9 is a diagram illustrating an example method, performed by the electronic device 1000, of obtaining information of the product 2000 from a sound signal, according to an embodiment of the disclosure.

Referring to FIG. 9, the electronic device 1000 may obtain information about the product 2000 based on a sound event.

The sound event may include a series of element sound signals. For example, a first sound event may include element sound signals sequentially generated from one fourth packaging element 912, one fifth packaging element 915, two sixth packaging elements 917, one seventh packaging element 919 and one fifth packaging element 915.

One sound event may correspond to one piece of information. For example, the first sound event may correspond to identification information of the product 2000 in the packaging material 100. A second sound event may correspond to operation information of the product 2000. Accordingly, as the first sound event and the second sound event are generated, the electronic device 1000 may obtain identification information and operation information of the external device 2000 or the product 2000 in the packaging material 100 based on sound signals of the first sound event and the second sound event.

According to an embodiment of the disclosure, a firstly generated sound event may be a trigger sound event indicating that the generating of the sound signal indicating the information about the product 2000 in the packaging material 100 has started. Accordingly, when detecting the trigger sound event, the electronic device 1000 may determine a sound signal generated after the trigger sound event as the sound signal corresponding to the information of the product 2000 in the packaging material 100, and obtain the information about the product 2000 based on the sound signal generated after the trigger sound event.

According to an embodiment of the disclosure, a finally generated sound event may be a stop sound event indicating that the sound signal indicating the information about the product 2000 in the packaging material 100 has stopped. Upon detecting the stop sound event, the electronic device 1000 may determine that a sound signal generated after the stop sound event is not the sound signal corresponding to the information of the external device 2000 or the product 2000 in the packaging material 100, and may not obtain the information from the sound signal generated after the stop sound event. Also, the electronic device 1000 may continue to receive a sound signal to detect another trigger sound event again.

Figure 10:
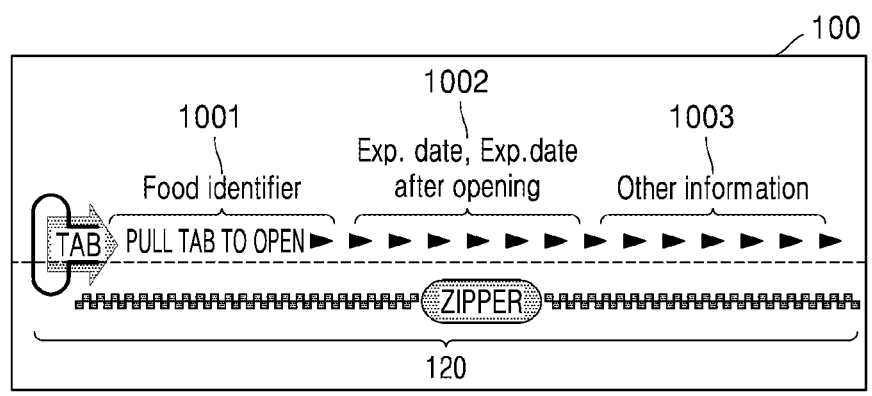
FIG. 10 is a diagram illustrating an example method, performed by an electronic device, of obtaining information of a product based on a sound event, according to various embodiments.

FIG. 10 is a diagram illustrating an example method, performed by the electronic device 1000, of obtaining information of the product 2000 based on a sound event, according to various embodiments.

Referring to FIG. 10, the packaging material 100 may, for example, be a paper bag including the zipper 120. The zipper 120 may generate a plurality of sound events. Food may be contained in the paper bag 100.

A first sound event 1001 may correspond to identification information of the food. A second sound event 1002 may correspond to an expiration date of the food before opening or an expiration date after opening. A third sound event 1003 may correspond to other information necessary for managing the food. For example, the third sound event 1003 may correspond to a storage temperature of the food.

Figure 11:
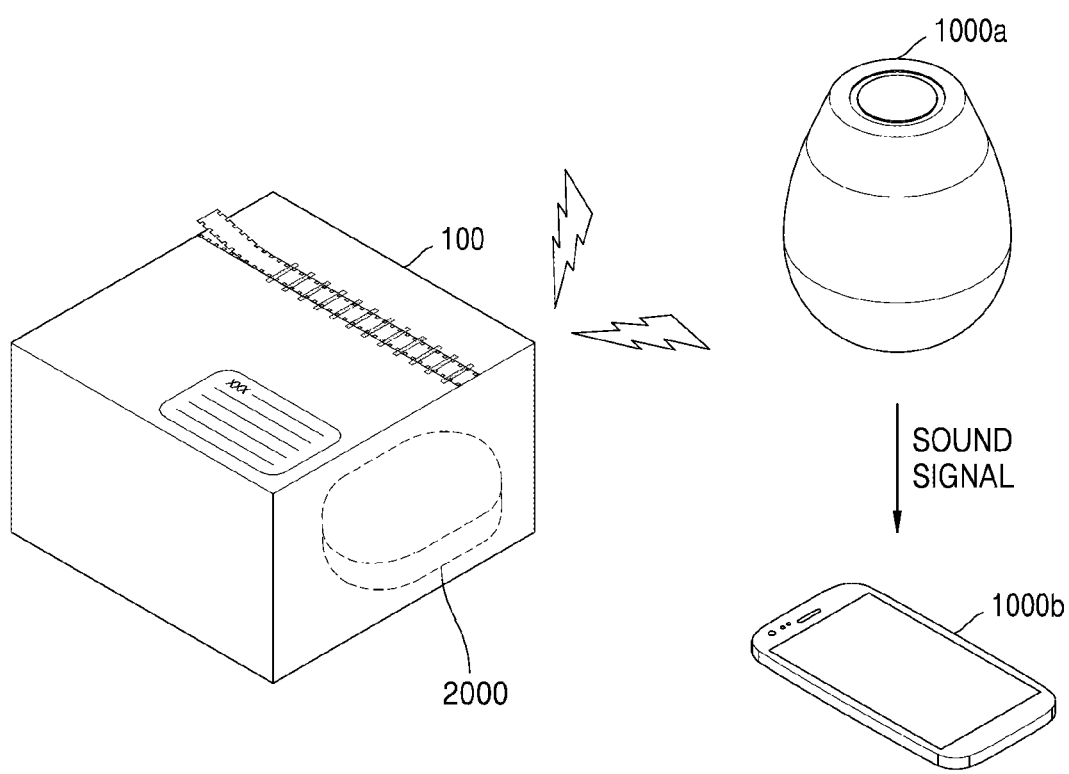
FIG. 11 is a diagram illustrating an example method, performed by an electronic device, of receiving a sound signal generated when a packaging material is unpacked, according to various embodiments.

FIG. 11 is a diagram illustrating an example method, performed by an electronic device 1000b, of receiving a sound signal generated when the packaging material 100 is unpacked, according to various embodiments.

Referring to FIG. 11, the electronic device 1000b may receive the sound signal generated when the packaging material 100 is unpacked from an artificial intelligence speaker 1000a.

The artificial intelligence speaker 1000a may be a speaker that continuously receives a peripheral sound signal including a user's voice and processes the received sound signal to provide a service to a user.

The electronic device 1000b may be connected to the artificial intelligence speaker 1000a wirelessly or by wire.

According to an embodiment of the disclosure, upon detecting a trigger sound event from the received sound signal, the artificial intelligence speaker 1000a may transmit a sound signal after the trigger sound event to the electronic device 1000b along with information indicating that the sound signal is a sound signal generated when the packaging material 100 is unpacked.

The artificial intelligence speaker 1000a may transmit the sound signal after the trigger sound event to a sound signal before a stop sound event to the electronic device 1000b.

In addition, according to an embodiment of the disclosure, the artificial intelligence speaker 1000a may obtain information about the product 2000 in the packaging material 100 based on the sound signal generated when the packaging material 100 is unpacked. Upon obtaining the information about the product 2000, the artificial intelligence speaker 1000a may transmit the information about the product 2000 to the electronic device 1000b.

Figure 12:
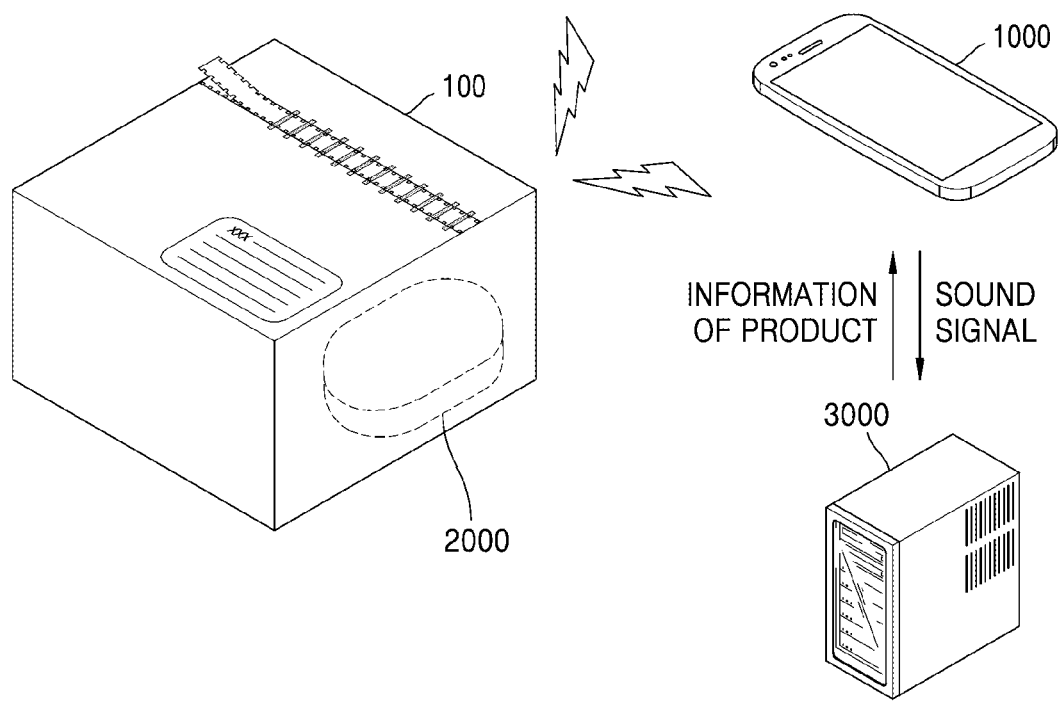
FIG. 12 is a diagram illustrating an example method, performed by an electronic device, of obtaining information of a product based on a sound signal, according to various embodiments.

FIG. 12 is a diagram illustrating an example method, performed by the electronic device 1000, of obtaining information of the product 2000 based on a sound signal, according to various embodiments.

Referring to FIG. 12, the electronic device 1000 may transmit the obtained sound signal to a server 3000 together with information indicating that the sound signal is a sound signal generated when the packaging material 100 is unpacked, and may receive the information about the product 2000 in the packaging material 100 from the server 3000.

According to an embodiment of the disclosure, when detecting a trigger sound event from the received sound signal, the electronic device 1000 may transmit a sound signal received thereafter to the server 3000 and may receive the information about the product 2000 from the server 3000. When detecting a stop sound event from the received sound signal, the electronic device 1000 may not transmit a sound signal after the stop sound event to the server 3000.

According to an embodiment of the disclosure, the server 3000 may identify a plurality of element sound signals in the received sound signal, and based on sound characteristics represented by the plurality of element sound signals and an order of the plurality of element sound, may determine the information about the product 2000.

According to an embodiment of the disclosure, the server 3000 may determine the information about the product 2000 from the sound signal using a pre-trained artificial intelligence model. For example, the server 3000 may include an artificial intelligence module that implements an artificial intelligence model trained according, for example, and without limitation, to at least one of machine learning, a neural network, or a deep learning algorithm. The artificial intelligence module may be previously trained and stored in the server 3000.

According to an embodiment of the disclosure, the feature of an input of the artificial intelligence module may be each of element sound signals included in the sound signal. In this case, an output of the artificial intelligence module may be a letter, number, or symbol corresponding to each of the element sound signals. As a plurality of element sound signals included in the sound signal are input to the artificial intelligence module, the artificial intelligence module may output the letter, number, or symbol corresponding to each of the element sound signals. The server 3000 may determine the information about the product 2000 represented by the sound signal based on the output letter, number, or symbol.

According to an embodiment of the disclosure, the feature of the input of the artificial intelligence module may be a sound event. In this case, the output of the artificial intelligence module may be information corresponding to the sound event.

According to an embodiment of the disclosure, the feature of the input of the artificial intelligence module may be the sound signal itself received from the electronic device 1000. In this case, the output of the artificial intelligence module may be information about at least one product 2000.

Figure 13:
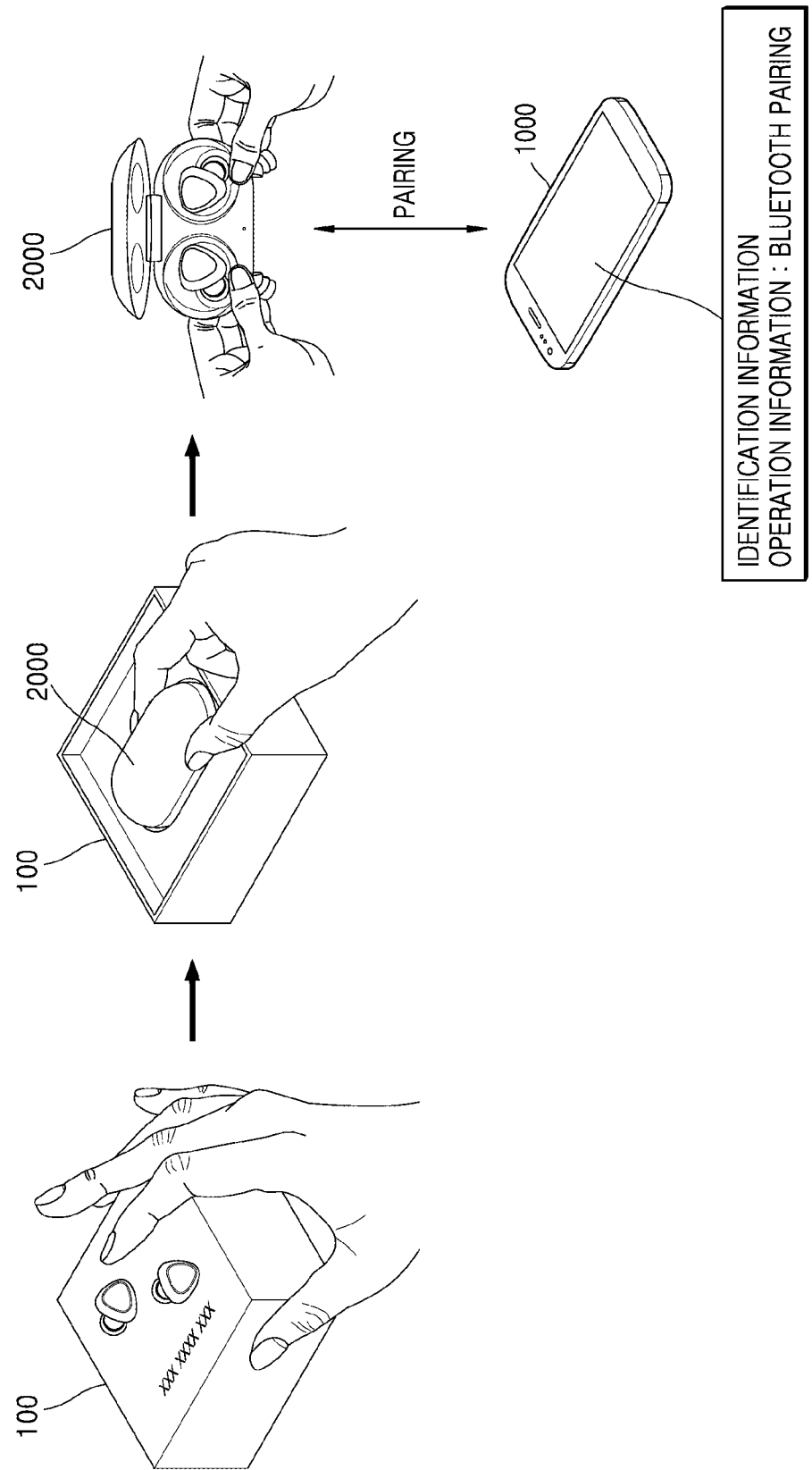
FIG. 13 is a diagram illustrating an example method, performed by an electronic device, of establishing a short-range communication connection with an external device in a packaging material according to operation information, according to various embodiments.

FIG. 13 is a diagram illustrating an example method, performed by the electronic device 1000, of establishing a short-range communication connection with the electronic device 1000 in the packaging material 100 according to operation information, according to various embodiments.

Referring to FIG. 13, the electronic device 1000 may establish the short-range communication connection with the external device 2000 in the packaging box 100 based on a sound signal generated when the packaging box 100 is unpacked.

When the packaging box 100 is opened by a user, a first sound signal may be generated by a packaging element previously designed in the packaging box 100. The electronic device 1000 may receive the generated first sound signal.

As the user takes out the external device 2000 from the packaging box 100, a second sound signal may be generated by a packaging element designed at a part where the external device 2000 comes into contact with the packaging box 100. The electronic device 1000 may receive the generated second sound signal.

The electronic device 1000 may obtain information about the external device 2000 based on the first and second sound signals. Referring to FIG. 13, the electronic device 1000 may obtain, for example, 'SM-R190N' as identification information of the external device 2000 and the operation information indicating Bluetooth pairing.

As the operation information indicating Bluetooth pairing is obtained, the electronic device 1000 may activate a Bluetooth communicator and receive data from peripheral devices according to a Bluetooth communication protocol to confirm whether there is the external device 2000 requesting the connection.

Upon receiving a user input for turning on the external device 2000, the external device 2000 may activate the Bluetooth communicator even though there is no user input. The external device 2000 may broadcast an advertisement signal requesting the short-range communication connection to peripheral devices.

Upon receiving the advertisement signal by the external device 2000, the electronic device 1000 may request an identification value of the external device 2000 from the external device 2000. Upon receiving 'SM-R190N' as the identification value of the external device 2000 from the external device 2000, when the identification information ('SM-R190N') obtained from the sound signal and the identification value ('SM-R190N') received from the external device 2000 are the same, the electronic device 1000 may determine that a device requesting the short-range communication connection is the external device 2000 in the packaging material 100, and the electronic device 1000 and the external device 2000 may perform a Bluetooth pairing operation.

As the electronic device 1000 and the external device 2000 perform the Bluetooth pairing operation, the electronic device 1000 and the external device 2000 may establish a Bluetooth communication connection.

Figure 14:
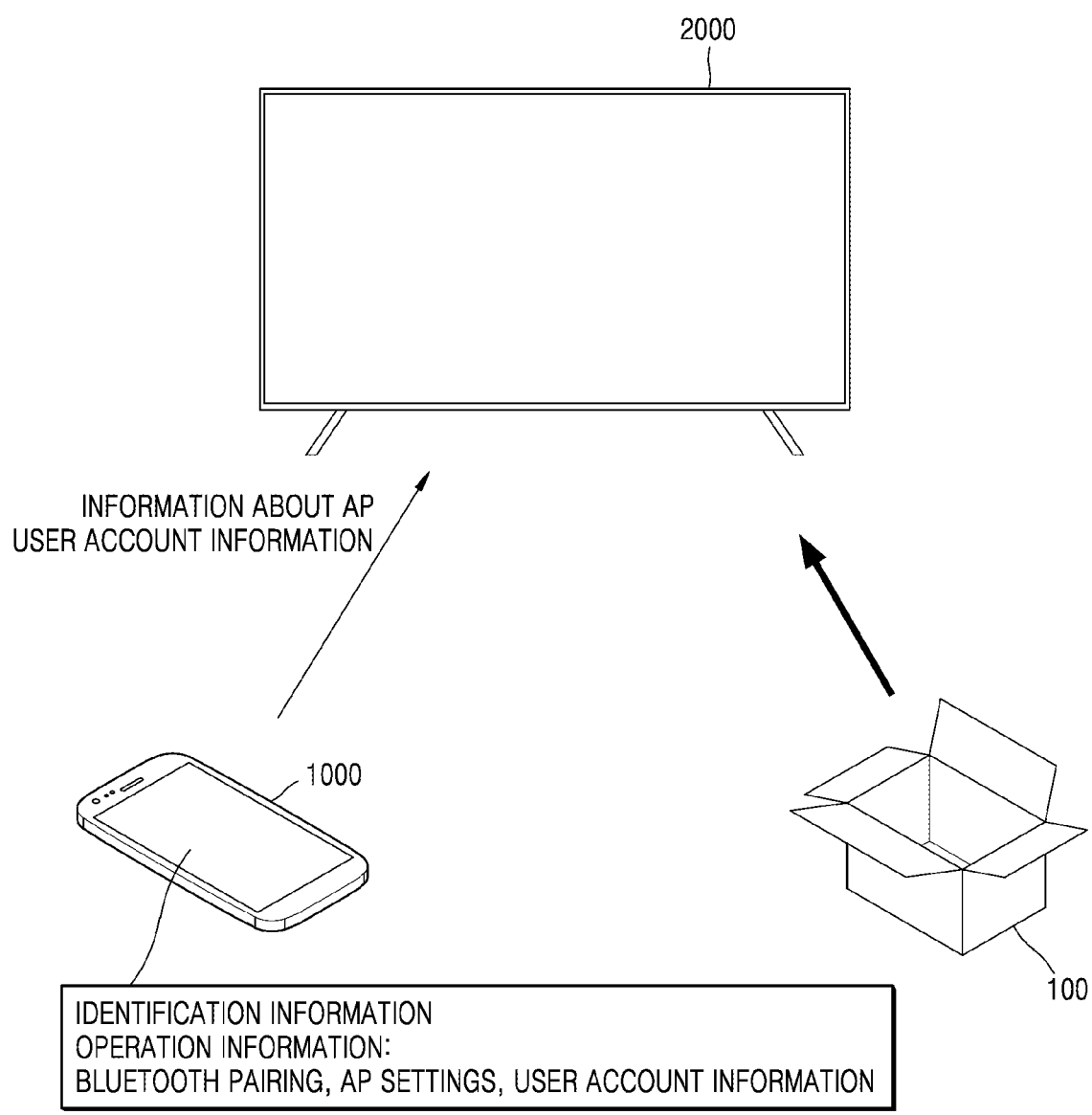
FIG. 14 is a diagram illustrating an example method, performed by an electronic device, of transmitting network settings information to an external device in a packaging material according to operation information, according to various embodiments.

FIG. 14 is a diagram illustrating an example method, performed by the electronic device 1000, of transmitting network settings information to the electronic device 1000 in the packaging material 100 according to operation information, according various embodiments.

Referring to FIG. 14, the electronic device 1000 may transmit the network settings information to the external device 2000 in the packaging box 100 based on a sound signal generated when the packaging box 100 is unpacked.

When a user opens the packaging box 100, as the sound signal is generated by a packaging element previously designed in the packaging box 100, the electronic device 1000 may obtain information of the external device 2000 based on the generated sound signal. Referring to FIG. 14, the electronic device 1000 may obtain 'smart TV' as identification information of the external device 2000. The electronic device 1000 may obtain the operation information indicating Bluetooth pairing, the operation information indicating AP settings, and the operation information indicating user account settings.

As the external device 2000 is turned on, the electronic device 1000 may, for example, establish a Bluetooth communication connection with the external device 2000 based on the identification information ('smart TV') and the operation information indicating Bluetooth pairing.

Based on the operation information indicating AP settings, the electronic device 1000 may transmit information about an access point of a wireless network to which the electronic device 1000 is connected to the external device 2000. The information about the access point may include network name information (e.g., a service set identifier) and access information (e.g., a password) of the access point, but is not limited thereto.

Based on the operation information indicating the user account settings, the electronic device 1000 may transmit the user account information stored in the electronic device 1000 to the external device 2000.

The user account information may include, for example, user account information registered in a service server that provides a service controlling in-house home appliance devices. The user account information may include, for example, user account information registered in a service server that provides content.

The user account information may include identification information of a service for which the user account information is used. The user account information may include address information of a service providing server that performs a service.

When the external device 2000 is turned on, the external device 2000 may activate a module storing information received from the Bluetooth communicator and the electronic device 1000. Upon establishing the Bluetooth communication connection with the electronic device 1000, the external device 2000 may receive information about AP and the user account information from the electronic device 1000 and store the information about AP and the user account information.

The external device 2000 may request a registration from the access point of the wireless network to which the electronic device 1000 is connected based on the information about the AP. Accordingly, the external device 2000 may transmit/receive data to/from a peripheral device or a server through the wireless network.

The external device 2000 may register itself with the service providing server based on the user account information. Accordingly, the external device 2000 may transmit/receive information about a service to and from the service providing server.

Figure 15:
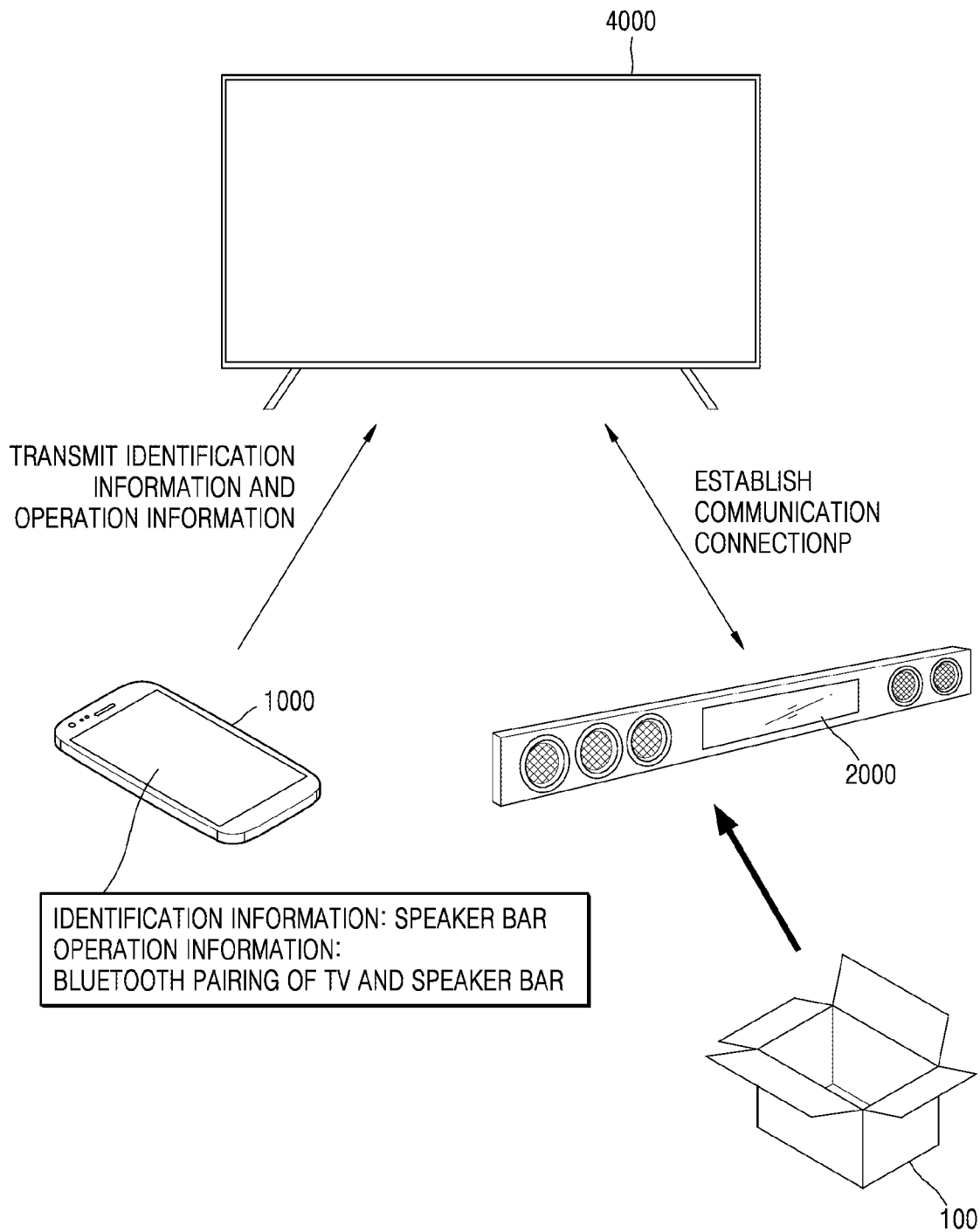
FIG. 15 is a diagram illustrating an example method, performed by an electronic device, of transmitting information of a product to another device, according to various embodiments.

FIG. 15 is a diagram illustrating an example method, performed by the electronic device 1000, of transmitting information of a product to another device 4000, according to various embodiments.

Referring to FIG. 15, when operation information obtained from a sound signal is information about operations of the device 4000 other than the electronic device 1000 and the external device 2000, the electronic device 1000 may transmit obtained identification information and operation information to the other device 4000.

For example, as shown in FIG. 15, when the identification information obtained from the sound signal is a 'speaker bar' 2000 and the operation information indicates Bluetooth pairing between a TV 4000 and the speaker bar 2000, the electronic device 1000 may request the TV 4000 to perform Bluetooth pairing with the speaker bar 2000 while transmitting the obtained identification information and operation information to the TV 4000.

Upon receiving a request for Bluetooth pairing from the electronic device 1000, the TV 4000 may activate a Bluetooth communication module and receive data from peripheral devices according to a Bluetooth communication protocol to confirm whether there is a device requesting a connection.

Upon receiving a user input for turning on the speaker bar 2000, the speaker bar 2000 may activate a Bluetooth communicator even though there is no user input.

Upon receiving a signal for requesting a short-range communication connection from the speaker bar 2000, the TV 4000 may establish the Bluetooth communication connection by performing Bluetooth pairing with the speaker bar 2000.

As an embodiment of the disclosure, upon receiving a sound signal for removing the packaging material 100 of food, the electronic device 1000 may request an oven to preheat for a preheating request time based on operation information obtained from the sound signal.

As an embodiment of the disclosure, upon receiving a sound signal for removing a coffee packaging, the electronic device 1000 may request coffee machine to preheat the coffee machine based on operation information obtained from the sound signal.

As an embodiment of the disclosure, upon receiving the sound signal for removing the packaging material 100 of the food, the electronic device 1000 may request a microwave oven to set an operating time based on the operation information obtained from the sound signal.

For example, upon receiving the sound signal for removing the packaging material 100 of the food, the electronic device 1000 may request a refrigerator to store expiration date information.

Figure 16:
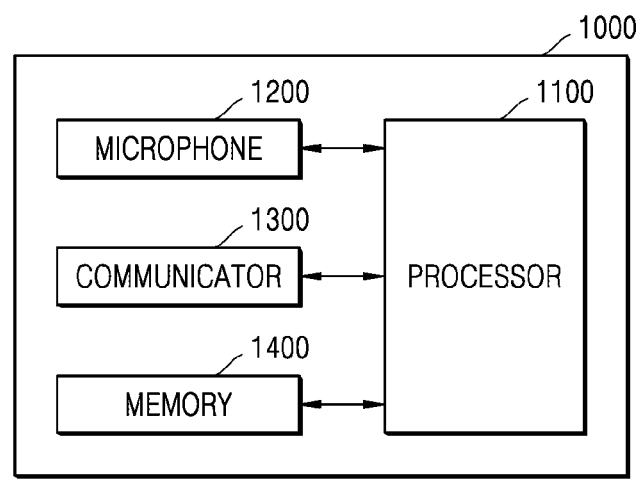
FIG. 16 is a block diagram illustrating an example configuration of an electronic device, according to various embodiments.

FIG. 16 is a block diagram illustrating an example configuration of the electronic device 1000, according to various embodiments.

Referring to FIG. 16, the electronic device 1000 may include a microphone 1200, a communicator (e.g., including communication circuitry) 1300, a memory 1400, and a processor (e.g., including processing circuitry) 1100.

The microphone 1200 may receive a sound signal around the electronic device 1000. The microphone 1200 may receive the sound signal generated when the packaging material 100 of the product 2000 is unpacked.

The communicator 1300 may include various communication circuitry and communicate with an external device through at least one wireless communication network.

The memory 1400 may store one or more instructions.

The processor 1100 may include various processing circuitry and control the overall configuration of the electronic device 1000 including the microphone 1200, the communicator 1300, and the memory 1400.

The processor 1100 may receive the sound signal generated when the packaging material 100 of the external device 2000 is unpacked through the microphone 1200.

The processor 1100 may obtain identification information of the external device 2000 and operation information about operations between the electronic device 1000 and the external device 2000 based on the received sound signal.

When the external device 2000 is turned on, through the communicator 1300, the processor 1100 may receive an identification value of the external device 2000 from the external device 2000, based on the identification value of the external device 2000 received from the external device 2000 and the obtained identification information, establish a communication connection with the external device 2000, and, through the communication connection, transmit data for an operation of the external device 2000 to the external device 2000 based on the operation information.

Figure 17:
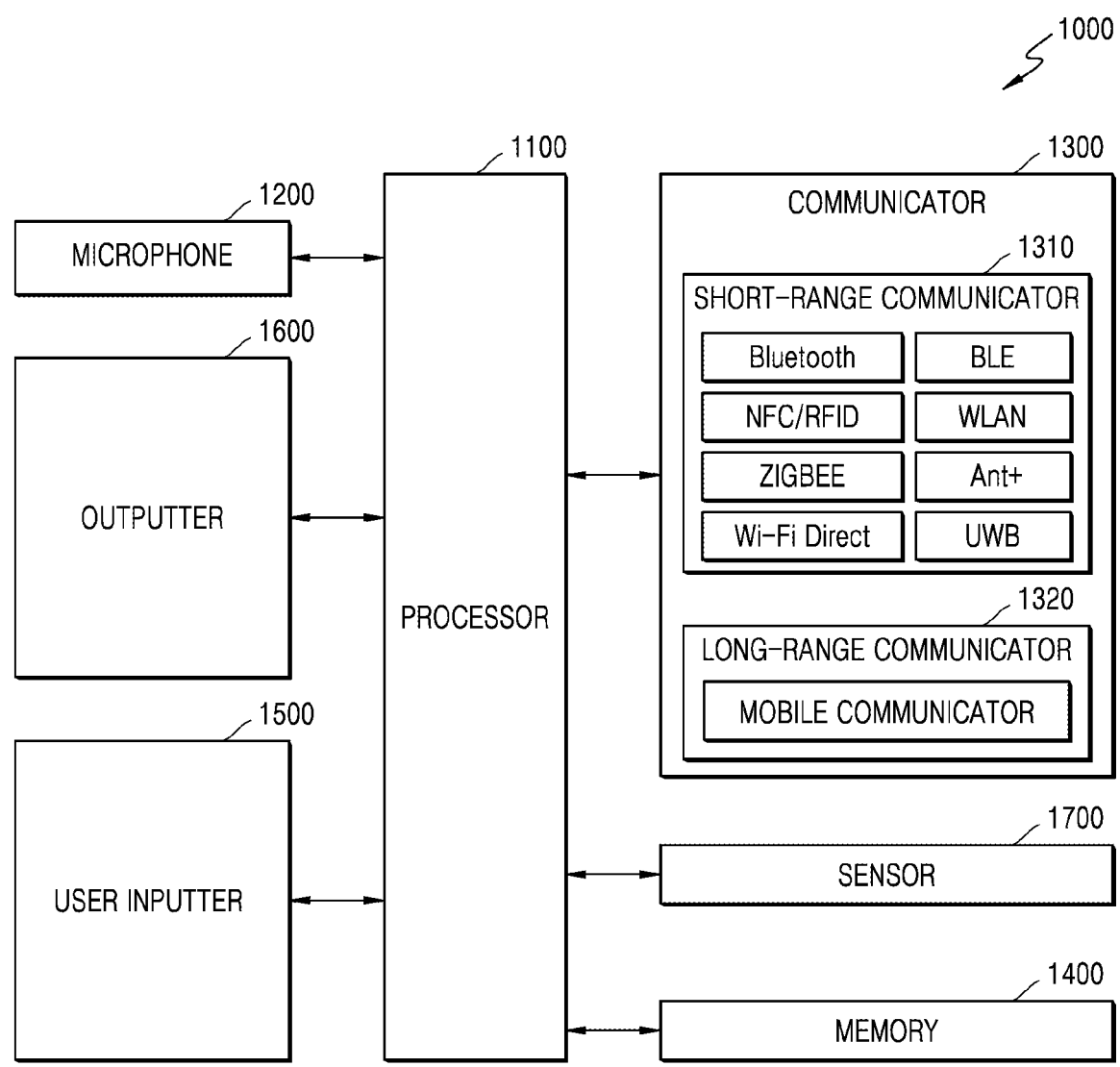
FIG. 17 is a block diagram illustrating an example configuration of an electronic device, according to various embodiments.

FIG. 17 is a block diagram illustrating an example configuration of the electronic device 1000, according to various embodiments.

Referring to FIG. 17, the electronic device 1000 may include the microphone 1200, the communicator (e.g., including communication circuitry) 1300, the memory 1400, a user inputter (e.g., including user input circuitry) 1500, an outputter (e.g., including output circuitry) 1600, a sensor 1700, and the processor (e.g., including processing circuitry) 1100. The same reference numerals are used for the same elements as those shown in FIG. 16.

However, not all elements illustrated in FIG. 17 are indispensable elements of the electronic device 1000. The electronic device 1000 may be implemented by more elements than those shown in FIG. 17, and the electronic device 1000 may be implemented by fewer elements than those shown in FIG. 17.

The outputter 1600 may include various output circuitry including, for example, a sound outputter (not shown) and a display (not shown).

The sound outputter (not shown) may output a sound signal to the outside of the electronic device 1000. The sound outputter (not shown) may include, for example, a speaker or a receiver. The speaker may be used for general purposes such as multimedia playback or recording playback.

The display (not shown) may output image data processed by an image processor (not shown) through a display panel (not shown) under the control by the processor 1100. A display panel (not shown) may include at least one of a liquid crystal display, a thin film transistor-liquid crystal display, an organic light-emitting diode, a flexible display, a three-dimensional (3D) display, or an electrophoretic display.

The user inputter 1500 may include various input circuitry configured to receive a user input for controlling the electronic device 1000. The user inputter 1500 may receive the user input and transmit the user input to the processor 1100.

The user inputter 1500 may include, for example, and without limitation, an input device including a touch panel detecting a user touch, a button receiving a push manipulation of a user, a wheel receiving a rotation manipulation of the user, a keyboard, a dome switch, etc., but is not limited thereto.

The user inputter 1500 may include a voice recognition apparatus (not shown) for voice recognition. For example, the voice recognition apparatus may be the microphone 1200, and the voice recognition apparatus may receive a voice command or a voice request of the user. Accordingly, the processor 1100 may control an operation corresponding to the voice command or the voice request to be performed.

The user inputter 1500 may include a motion detection sensor (not shown). For example, the motion detection sensor (not shown) may detect a motion of the electronic device 1000 and receive the detected motion as a user input. In addition, the voice recognition apparatus (not shown) and the motion detection sensor (not shown) described above are not included in the user inputter 1500, but may be included in the electronic device 1000 as a module independent of the user inputter 1500.

The memory 1400 stores various types of information, data, instructions, programs, etc. necessary for the operation of the electronic device 1000. The memory 1400 may include at least one of a volatile memory and a non-volatile memory, or a combination thereof. The memory 1400 may include at least one type of storage medium among flash memory, a hard disk, a multimedia card micro, a memory card (e.g., a secure digital (SD) or extreme digital (XD) memory card), random access memory (RAM), static RAM (SRAM), read-only memory (ROM), electrically erasable programmable ROM (EEPROM), programmable ROM (PROM), magnetic memory, a magnetic disc, or an optical disc. Also, the electronic device 1000 may operate a web storage or a cloud server that performs a storage function on the Internet.

The communicator 1300 may include various communication circuitry and transmit and/or receive information, an image signal, or an audio signal according to a protocol with a source device (not shown) or an external server under the control by the processor 1100. The communicator 1300 may include at least one communication module transmitting and receiving data to and from an external device (not shown) and at least one port.

The communicator 1300 may communicate with the external device through at least one wired or wireless communication network. The communicator 1300 may include at least one of a short-range communicator (e.g., including short-range communication circuitry) 1310 and a long-range communicator (e.g., including long-range communication circuitry) 1320 or a combination thereof. The communicator 1300 may include at least one antenna wirelessly communicating with another device.

The short-range communicator 1310 may include at least one communication module (not shown) including various short-range communication circuitry for performing communication according to a communication standard such as Bluetooth, Wi-Fi, Bluetooth Low Energy (BLE), NFC/RFID, Wi-Fi Direct, UWB, or ZIGBEE. In addition, the long-range communicator 1320 may include a communication module (not shown) performing communication through a network for Internet communication. The long-range communicator 1320 may include a mobile communicator including various long-range communication circuitry for performing communication according to a communication standard such as $3^{rd}$ generation (3G), $4^{th}$ generation (4G), $5^{th}$ generation (5G), and/or $6^{th}$ generation (6G).

The communicator 1300 may include a communication module, for example, an infrared (IR) communication module, capable of receiving a control command from a remote controller (not shown) located at a short distance.

The sensor 1700 may include various types of sensors, for example, an image sensor, an infrared sensor, an ultrasonic sensor, a lidar sensor, a human motion detection sensor, a motion detection sensor, a proximity sensor, an illuminance sensor, etc. A function of each sensor may be intuitively inferred by a person skilled in the art from the name thereof, and thus a detailed description thereof may not be repeated.

The processor 1100 may include various processing circuitry and controls the overall operation of the electronic device 1000. The processor 1100 may execute a program stored in the memory 1400 to control elements of the electronic device 1000.

According to an embodiment of the disclosure, the processor 1100 may include, for example, and without limitation, a separate neural processing unit (NPU) performing an operation of a machine-trained model. The processor 1100 may include, for example, and without limitation, a central processing unit (CPU), a graphics processing unit (GPU), etc.

According to an embodiment of the disclosure, the processor 1100 may include a hardware structure (e.g., a neural network processor) specialized for processing an artificial intelligence model. The artificial intelligence model may be generated through machine learning. Such training may be performed, for example, in the electronic device 1000 itself on which the artificial intelligence model is performed, or may be performed through a server.

Examples of the learning algorithm may include supervised learning, unsupervised learning, semi-supervised learning, and reinforcement learning, but are not limited thereto. The artificial intelligence model may include a plurality of artificial neural network layers. Examples of an artificial neural network may include, for example, and without limitation, deep neural network (DNN), convolutional neural network (CNN), recurrent neural network (RNN), restricted boltzmann machine (RBM), deep belief network (DBN), bidirectional recurrent deep neural network (BRDNN), deep Q-network or a combination of two or more of the above, but are not limited thereto. The artificial intelligence model may include, additionally or alternatively, a software structure besides the hardware structure.

As used in various embodiments of the disclosure, the term "module" or "-er/-or" may include a unit implemented in hardware, software, or firmware, and may be used interchangeably with the term, for example, logic, logic block, component, or circuit. The module may be an integrally configured component or a minimum unit or a part of the component that performs one or more functions. For example, according to an embodiment of the disclosure, the module may be implemented in the form of an application-specific integrated circuit (ASIC).

According to various embodiments of the disclosure, each element (e.g., a module or a program) of the above-described elements may include a singular or a plurality of entities, and some of the plurality of entities may be separately disposed in the other elements. According to various embodiments of the disclosure, one or more elements or operations may be omitted from among the above-described corresponding elements, or one or more other elements or operations may be added. Alternatively or additionally, a plurality of elements (e.g., modules or programs) may be integrated into one element. In this case, the integrated element may perform one or more functions of each element of the plurality of element identically or similarly to those performed by the corresponding element among the plurality of element prior to integration. According to various embodiments of the disclosure, operations performed by the module, the program, or another element may be executed sequentially, in parallel, repeatedly, or heuristically, one or more operations of the operations may be executed in a different order or omitted, or one or more other operations may be added.

The machine-readable storage medium may be provided in the form of a non-transitory storage medium. When the storage medium is 'non-transitory', the storage medium is tangible and may not include signals (e.g., electromagnetic waves), and it does not limit that data is semi-permanently or temporarily stored in the storage medium. For example, the 'non-transitory storage medium' may include a buffer for temporarily storing data.

According to an embodiment, the method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be online distributed (e.g., downloaded or uploaded) via an application store (e.g., Samsung Galaxy Store™) or directly between two user devices (e.g., smartphones). For online distribution, at least a part of the computer program product (e.g., a downloadable app) may be temporarily generated or be at least temporarily stored in a machine-readable storage medium, e.g., a memory of a server of a manufacturer, a server of an application store, or a relay server.

While the disclosure has been illustrated and described with reference to various example embodiments, it will be understood that the various example embodiments are intended to be illustrative, not limiting. It will be further understood by those skilled in the art, that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method, performed by an electronic device, of controlling an external device using a sound signal, the method comprising:
obtaining the sound signal generated based on a packaging material of the external device being unpacked;
obtaining identification information of the external device and operation information about an operation between the electronic device and the external device based on the obtained sound signal;
receiving an identification value of the external device from the external device based on the external device being turned on;
establishing a communication connection with the external device based on the identification value of the external device received from the external device and the identification information obtained from the sound signal; and
transmitting, through the communication connection, based on the operation information, to the external device, data for an operation of the external device.

2. The method of claim 1, wherein the sound signal comprises a plurality of element sound signals, and
wherein the obtaining of the identification information of the external device and the operation information comprises:
determining the identification information of the external device and the operation information based on sound characteristics represented by the plurality of element sound signals and an order of the plurality of element sound signals.

3. The method of claim 2, wherein the sound characteristics represented by the plurality of element sound signals are determined based on at least one of a material of the packaging material or a design of a zipper provided on the packaging material to unpack the packaging material.

4. The method of claim 1, wherein the receiving of the identification value of the external device from the external device based on the external device being turned on comprises:
activating short-range communication circuitry based on the operation information; and
receiving the identification value of the external device from the external device through the short-range communication circuitry.

5. The method of claim 1, wherein the sound signal comprises a trigger sound signal indicating that the unpacking of the packaging material of the external device has started, and
wherein the obtaining of the identification information of the external device and the operation information comprises:
based on the trigger sound signal being detected, obtaining the identification information of the external device and the operation information from the received sound signal.

6. The method of claim 1, wherein the obtaining of the identification information of the external device and the operation information comprises:
transmitting the obtained sound signal to a server; and
receiving the identification information of the external device and the operation information from the server.

7. The method of claim 1, wherein the operation information comprises Bluetooth pairing information, and
wherein the establishing of the communication connection with the external device comprises:
establishing Bluetooth pairing with the external device based on the identification information of the external device and the Bluetooth pairing information.

8. The method of claim 1, wherein the operation information comprises network settings information for network settings of the external device, and
wherein the transmitting of the data for the operation of the external device to the external device comprises:
based on the communication connection being established, based on the network settings information, transmitting, to the external device, at least one of authentication information with respect to an access point of a network or account information of a user of the electronic device with respect to an external server.

9. The method of claim 1, wherein the operation information comprises pairing information with respect to another device for performing pairing between the external device and the other device, the method further comprising:

transmitting the identification information of the external device to the another device.

10. The method of claim 1, further comprising:

obtaining another sound signal generated based on a packaging material of food being unpacked;

obtaining identification information of the food in the packaging material and expiration date information of the food based on the obtained another sound signal; and transmitting, to a refrigerator, at least one of the identification information of the food, the expiration date information, or opening date information about a date the packaging material is unpacked.

11. An electronic device comprising:

a communicator comprising communication circuitry;

a microphone;

at least one memory storing one or more instructions; and at least one processor configured, by executing the one or more instructions, to:

receive, through the microphone, a sound signal generated based on a packaging material of an external device being unpacked;

obtain identification information of the external device and operation information about an operation between the electronic device and the external device based on the received sound signal;

receive an identification value of the external device from the external device through the communicator based on the external device being turned on;

establish a communication connection with the external device based on the identification value of the external device received from the external device and the obtained identification information; and transmit, through the communication connection, based on the operation information, to the external device, data for an operation of the external device.

12. The electronic device of claim 11, wherein the sound signal comprises a plurality of element sound signals, and wherein the at least one processor is configured, by executing the one or more instructions, to: determine the identification information of the external device and the operation information based on sound characteristics represented by the plurality of element sound signals and an order of the plurality of element sound signals.

13. The electronic device of claim 12, wherein the sound characteristics represented by the plurality of element sound signals are determined based on at least one of a material of the packaging material or a design of a zipper provided on the packaging material to unpack the packaging material.

14. The electronic device of claim 11, wherein the at least one processor is configured, by executing the one or more instructions, to: activate a short-range communicator comprising short-range communication circuitry based on the operation information; and receive the identification value of the external device from the external device through the short-range communicator.

15. The electronic device of claim 11, wherein the sound signal comprises a trigger sound signal indicating that the unpacking of the packaging material of the external device has started, and wherein the at least one processor is configured, by executing the one or more instructions, as the trigger sound signal is detected, to: obtain, from the received sound signal, the identification information of the external device and the operation information.

16. The electronic device of claim 11, wherein the at least one processor is configured, by executing the one or more instructions, to: transmit, via the communicator, the obtained sound signal to a server and receive, via the communicator, the identification information of the external device and the operation information from the server.

17. The electronic device of claim 11, wherein the operation information comprises Bluetooth pairing information, and wherein the at least one processor is configured, by executing the one or more instructions, to: establish Bluetooth pairing with the external device based on the identification information of the external device and the Bluetooth pairing information.

18. The electronic device of claim 11, wherein the operation information comprises network settings information for network settings of the external device, and wherein the at least one processor is configured, by executing the one or more instructions, to: based on the communication connection being established, based on the network settings information, transmit, via the communicator, to the external device, at least one of authentication information with respect to an access point of a network or account information of a user of the electronic device with respect to an external server.

19. The electronic device of claim 11, wherein the operation information comprises pairing information with respect to another device for performing pairing between the external device and the other device, and wherein the at least one processor is configured, by executing the one or more instructions, to: transmit, via the communicator, the identification information of the external device to the another device.

20. The electronic device of claim 11, wherein the at least one processor is configured, by executing the one or more instructions, to: obtain another sound signal generated based on a packaging material of food being unpacked, obtain identification information of the food in the packaging material and expiration date information of the food based on the obtained another sound signal; and transmit, to a refrigerator, via the communicator, at least one of the identification information of the food, the expiration date information, or opening date information about a date when the packaging material is unpacked.

* * * * *